(12) United States Patent
Yamamoto

(10) Patent No.: US 12,078,460 B2
(45) Date of Patent: Sep. 3, 2024

(54) GAS GENERATOR

(71) Applicant: Daicel Corporation, Osaka (JP)

(72) Inventor: Koji Yamamoto, Tokyo (JP)

(73) Assignee: DAICEL CORPORATION, Osaka (JP)

(*) Notice: Subject to any disclaimer, the term of this patent is extended or adjusted under 35 U.S.C. 154(b) by 198 days.

(21) Appl. No.: 17/624,574

(22) PCT Filed: Jan. 30, 2020

(86) PCT No.: PCT/JP2020/003517
§ 371 (c)(1),
(2) Date: Jan. 4, 2022

(87) PCT Pub. No.: WO2021/009948
PCT Pub. Date: Jan. 21, 2021

(65) Prior Publication Data
US 2022/0268558 A1    Aug. 25, 2022

(30) Foreign Application Priority Data

Jul. 12, 2019 (JP) .................. 2019-130614

(51) Int. Cl.
*F42B 3/04* (2006.01)
*B01J 7/00* (2006.01)
*B60R 21/264* (2006.01)

(52) U.S. Cl.
CPC .................... *F42B 3/04* (2013.01); *B01J 7/00* (2013.01); *B60R 21/264* (2013.01); *B60R 2021/2642* (2013.01)

(58) Field of Classification Search
CPC .......... F42C 19/0807; F42B 3/04; F42B 3/10; B60R 21/264; B60R 21/2642; B60R 21/2644; B60R 21/2648
See application file for complete search history.

(56) References Cited

U.S. PATENT DOCUMENTS 6,364,354 B1 * 4/2002 Nakashima ........ B01D 46/2411
280/736
6,764,096 B2    7/2004 Quioc
(Continued)

FOREIGN PATENT DOCUMENTS

CN    110228441 A * 9/2019 ............. B60R 21/26
DE    112018006194 T5    8/2020
(Continued)

OTHER PUBLICATIONS

International Search Report issued Apr. 14, 2020 in International Application No. PCT/JP2020/003517, 5 pages.
(Continued)

*Primary Examiner* — Bret Hayes
(74) *Attorney, Agent, or Firm* — XSENSUS LLP

(57) ABSTRACT

In a gas generator, a closing member includes: a first region exposed to a side of a second combustion chamber in a closed state, a second region in contact with a partition member from a side of the first combustion chamber in the closed state, and an engagement region that engages an engaged member fixed in a housing in the closed state; and the closing member is configured to have one or a plurality of communication holes be in a closed state by the closing member being supported at the partition member in the second region due to combustion pressure of a first gas generating agent and to have the closed state released by at least a part of the closing member, the closing member including a displacement portion that is formed continuously so as to be included at least a part of the first region, being displaced in a direction from the side of the second combustion chamber toward the side of the first combustion chamber by combustion pressure of a second gas generating agent acting on the first region.

19 Claims, 17 Drawing Sheets

(56) References Cited

U.S. PATENT DOCUMENTS

| | | | |
|---|---|---|---|
| 2003/0132623 A1 | 7/2003 | Iwai et al. | |
| 2004/0046373 A1 | 3/2004 | Wang et al. | |
| 2007/0120349 A1 | 5/2007 | Hoffman et al. | |
| 2009/0288574 A1* | 11/2009 | Jackson | B60R 21/2644 102/530 |
| 2011/0221173 A1* | 9/2011 | Cox | B60R 21/263 280/736 |
| 2020/0039463 A1* | 2/2020 | Fukui | F42B 3/12 |

FOREIGN PATENT DOCUMENTS

| | | | | |
|---|---|---|---|---|
| DE | 112015003553 B4 | 12/2023 | | |
| JP | 2003-089337 A | 3/2003 | | |
| JP | 2012-245873 A | 12/2012 | | |
| JP | 2018-12418 A | 1/2018 | | |
| JP | 2018-75985 A | 5/2018 | | |
| WO | WO-03066390 A1 * | 8/2003 | | B60R 21/2644 |
| WO | WO-2018016308 A1 * | 1/2018 | | B01J 7/00 |
| WO | WO-2018088132 A1 * | 5/2018 | | B60R 21/264 |

OTHER PUBLICATIONS

Written Opinion of the International Searching Authority issued Apr. 14, 2020 in International Application No. PCT/JP2020/003517, 6 pages.

English machine translation of the Office Action issued on Jan. 25, 2024, in the counterpart German patent application No. 112020003376.7, 8 pages.

* cited by examiner

US 12,078,460 B2

GAS GENERATOR

CROSS-REFERENCE TO RELATED APPLICATIONS

The present application is based on PCT filing PCT/JP2020/003517, filed Jan. 30, 2020, which claims priority to Japanese Patent Application No. 2019-130614, filed on Jul. 12, 2019, the entire contents of each are incorporated herein by reference.

TECHNICAL FIELD

The present invention relates to a gas generator configured to burn a gas generating agent by actuation of an igniter, thereby generating combustion gas.

BACKGROUND ART

For gas generators generating combustion gas by burning a gas generating agent contained inside a combustion chamber, technology is being developed to set a characteristic (hereinafter, releasing characteristic) with a parameter such as discharge amount or discharge time of the combustion gas to a desired characteristic, by using two igniters and controlling the combustion timing of the gas generating agent of each igniter. For example, Patent Document 1 discloses a dual type gas generator in which an internal space of a housing is divided by a partition member into: a first combustion chamber in which a first igniter and a gas generating agent that is a combustion target of the first igniter are disposed; and a second combustion chamber in which a second igniter that operates after the operation of the first igniter and a gas generating agent that is a combustion target of the second igniter are disposed. In this gas generator, a plurality of gas discharge ports that connect the first combustion chamber and the outside of the housing are provided in the housing, and a plurality of communication holes that connect the first combustion chamber and the second combustion chamber are provided in the partition member, where the communication holes are closed by the sealing tape from the first combustion chamber side. In such a gas generator, when the first igniter is operated and the gas generating agent within the first combustion chamber is combusted, the combustion gas generated in the first combustion chamber does not flow into the second combustion chamber but is released to the outside of the housing via the gas discharge ports. On the other hand, when the second igniter is operated after the operation of the first igniter and the gas generating agent within the second combustion chamber is combusted, the combustion gas generated in the second combustion chamber ruptures the sealing tape of the communication holes by the combustion pressure, flows into the first combustion chamber via the opened communication holes, and is released to the outside of the housing via the gas discharge ports.

CITATION LIST

Patent Document

Patent Document 1: U.S. Pat. No. 6,764,096

SUMMARY OF INVENTION

Technical Problem

As described above, when the plurality of communication holes are closed by the sealing tape, a combination of a slight difference in size of the communication holes caused by machining tolerances or the like and a slight difference in thickness (difference in strength) of the sealing tape applied to the communication holes may result in a difference in the burst strength (burst load) of the sealing tape. Therefore, even if it appears as a combination of the same communication holes and the sealing tape, communication holes that open and communication holes that do not open during the operation may form. As a result, the opening area of the communication hole cannot be obtained with good reproducibility, and the releasing characteristics of the combustion gas may fluctuate.

In view of the circumstances described above, an object of the present disclosure is to provide a technique in which the desired releasing characteristics can be obtained with good reproducibility in a dual type gas generator.

Solution to Problem

To solve the above problems, the present disclosure adopts the following configuration. That is, a gas generator of the present disclosure relates to a gas generator including a housing; a first igniter; a second igniter configured to be actuated independently of the first igniter; a partition member configured to define, in the housing, a first combustion chamber in which the first igniter and a first gas generating agent combusted by actuation of the first igniter are accommodated, and a second combustion chamber in which the second igniter and a second gas generating agent combusted by actuation of the second igniter are accommodated; and a gas discharge port provided in the housing, configured to communicate the first combustion chamber and outside of the housing, where one or a plurality of communication holes, provided in the partition member, are configured to communicate the first combustion chamber and the second combustion chamber, and a single closing member configured to entirely cover the one or the plurality of communication holes from a side of the first combustion chamber to obtain a closed state in which the one or the plurality of communication holes are closed, is further provided; the closing member includes, a first region exposed to a side of the second combustion chamber in the closed state, a second region in contact with the partition member from the side of the first combustion chamber in the closed state, and an engagement region that is engaged with an engaged member fixed in the housing in the closed state; and the closing member is configured to have the one or the plurality of communication holes be in the closed state by the closing member being supported by the partition member in the second region due to combustion pressure of the first gas generating agent and to have the closed state released by at least a part of the closing member, the closing member including a displacement portion that is formed continuously so as to be included at least a part of the first region, being displaced in a direction from the side of the second combustion chamber toward the side of the first combustion chamber by combustion pressure of the second gas generating agent acting on the first region.

According to such a gas generator, the closing member is configured such that the second region is pressed against the partition member by the combustion pressure of the first gas generating agent and the communication hole is in the closed state; and thus the combustion gas of the first gas generating agent is suppressed from flowing into the second combustion chamber from the first combustion chamber through the communication hole, and an event in which the second gas generating agent is combusted by the combustion gas of the first gas generating agent can be prevented. In other words, the effect of preventing inflammation from the first combustion chamber to the second combustion chamber can be obtained. As a result, the second gas generating agent can be combusted at a desired timing by the actuation of the second igniter.

Furthermore, in the gas generator of the present disclosure, the closing member is configured such that at least a part of the closing member, the closing member including a displacement portion, displaces from the second combustion chamber side toward the first combustion chamber side due to the combustion pressure of the second gas generating agent acting on the first region. Here, the displacement portion is a site including at least a part of the first region exposed to the second combustion chamber in the closed state, and thus, at least a part of the first region also separates from the communication hole when the displacement portion is displaced in a direction from the second combustion chamber side toward the first combustion chamber side away from the communication hole, whereby the closed state is released. At this time, because the displacement portion is formed as a continuous site, the communication hole can be opened in a similar manner regardless of the presence or absence and the degree of the pressure unevenness and the load unevenness of the pressure acting on the first region. As a result, the opening area of the communication hole can be obtained with good reproducibility. According to the gas generator as described above, the flow and pressure of the combustion gas inside the housing are controlled as desired, and the desired releasing characteristics can be obtained with good reproducibility. Note that in the gas generator described above, the closing member may be configured such that the entire closing member displaces in a direction from the second combustion chamber side toward the first combustion chamber side due to the combustion pressure of the second gas generating agent acting on the first region. As a result, the entire first region may be separated from the communication hole, and the entire communication hole can be uniformly opened.

Here, the state in which the first region is exposed on the side of the second combustion chamber refers to a state in which the first region is not covered with respect to the second combustion chamber and the combustion gas from the second combustion chamber may come into contact with the first region. Furthermore, the second igniter of the present disclosure is not limited to being always actuated, and also includes that which can be actuated simultaneously with the first igniter. That is, the gas generator of the present disclosure includes a gas generator in which the second igniter is not actuated and only the first igniter is actuated, or a gas generator in which the first igniter and the second igniter are simultaneously actuated. The first gas generating agent and the second gas generating agent may be gas generating agents of an identical type, an identical shape, and an identical dimension, or may be gas generating agents of different type, different shape, and different size. Alternatively, the closing member may be formed on a single member by one continuous member, or may be formed as a single member as a whole by combining a plurality of members.

Furthermore, in the gas generator of the present disclosure, a fragile part may be formed in the first region, by weakening the strength than the displacement portion, such that the closing member deforms and the displacement portion preferentially displaces with respect to the engagement region due to the combustion pressure of the second gas generating agent acting on the first region.

As a result, when the combustion pressure of the second gas generating agent acts on the first region, the displacement portion easily moves from the second combustion chamber side toward the first combustion chamber side. As a result, when the second gas generating agent is combusted, the closed state of the communication hole can be rapidly released, and hence the combustion gas can rapidly flow from the second combustion chamber into the first combustion chamber.

In the gas generator described above, an inner cylinder member having a cylindrical shape is provided, the inner cylinder member in which the first igniter is accommodated and in which a space inside the inner cylinder member forms a part of the first combustion chamber being provided as the engaged member; a through-hole which penetrates the inner cylinder member may be formed in the partition member; and the engagement region may be formed as an inner wall of an insertion hole that fits with the inner cylinder member such that the inner cylinder member is inserted and that the displacement portion moves out from the fragile part and moves along an axial direction of the inner cylinder member due to the combustion pressure of the second gas generating agent acting on the first region.

In the gas generator of the present disclosure described above, an inner cylinder member having a cylindrical shape is provided, the inner cylinder member in which the first igniter is accommodated and in which a space inside the inner cylinder member forms a part of the first combustion chamber being provided as the engaged member; a through-hole which penetrates the inner cylinder member may be formed in the partition member; and the engagement region may be formed as an inner wall of an insertion hole that fits with the inner cylinder member such that the inner cylinder member is inserted and that the closing member moves along an axial direction of the inner cylinder member due to the combustion pressure of the second gas generating agent acting on the first region.

According to the above, when the communication hole is in the closed state, the closed state can be more reliably maintained by suppressing the shift of the closing member by the fitting of the inner cylinder member and the insertion hole, and when releasing the closed state of the communication hole, the displacement portion or the closing member is guided by the inner cylinder member and moves in a direction of separating from the communication hole, and the communication hole can be more reliably opened.

Further, in the gas generator described above, the inner cylinder member may include a fitting portion that fits into the insertion hole in the closed state, and a small diameter portion that is formed continuously with the fitting portion in an axial direction of the inner cylinder member on a side away from the second combustion chamber than the fitting portion, the small diameter portion having a smaller outer diameter than the fitting portion.

According to such a configuration, since the small diameter portion is formed on the side away from the second combustion chamber than the fitting portion, when the combustion pressure of the second gas generating agent acts on the first region of the closing member, the fitting between the insertion hole and the fitting portion can be easily released, and thus the closing member can rapidly move from the second combustion chamber side to the first combustion chamber side. Thus, when the second gas generating agent is combusted, the closed state of the communication hole can be rapidly released, and the combustion gas can rapidly flow from the second combustion chamber into the first combustion chamber.

Furthermore, in the gas generator according to the present disclosure, a gap is formed between an outer circumferential surface of the inner cylinder member and an inner wall of the through-hole, and the one or the plurality of communication holes may be formed as the gap.

According to this configuration, a communication hole separate from the through-hole may not be provided in the partition member by utilizing a through-hole, that passes through the inner cylinder member to have the inside of the inner cylinder member as a part of the first combustion chamber, in forming the communication hole.

Furthermore, in the gas generator described above, a projecting piece that projects out an inner side in a radial direction and comes into contact with the second region in the closed state may be formed on the inner wall of the through-hole. Moreover, in the gas generator according to the present disclosure, the through-hole and the inner cylinder member are fitted together, and the one or a plurality of communication holes may be formed at a position different from the through-hole in the partition member.

According to this configuration, the contact area for supporting the closing member with respect to the combustion pressure of the first gas generating agent can be greatly ensured. As a result, the closing member can be supported more securely, and deformation of the partition member caused by the combustion pressure of the first gas generating agent can be suppressed.

Advantageous Effects of Invention

According to the techniques of the present disclosure, it is possible to obtain the desired releasing characteristics in a dual type gas generator with good reproducibility.

DESCRIPTION OF EMBODIMENTS

A gas generator according to an embodiment of the present disclosure will be described below with reference to the drawings. Note that each of the configurations, combinations thereof, and the like in each embodiment is an example, and various additions to the configuration, omissions, substitutions, and other changes may be made as appropriate without departing from the spirit of the present invention. The present invention is not limited by the embodiments and is limited only by the claims.

First Embodiment

Overall Configuration

Figure 1:
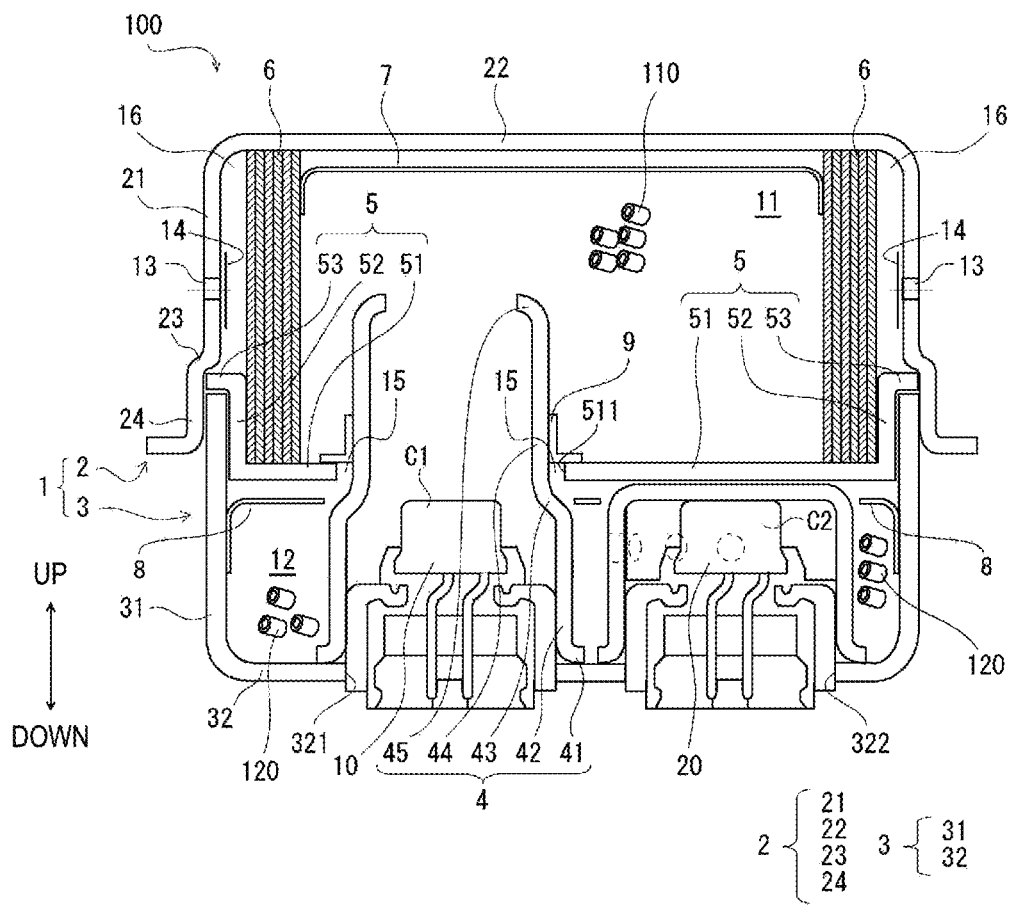
FIG. 1 is an axial cross-sectional view of a gas generator according to a first embodiment.

FIG. 1 is an axial cross-sectional view of a gas generator 100 according to a first embodiment of the present disclosure. In FIG. 1, cross-sectional hatching is omitted. As illustrated in FIG. 1, the gas generator 100 is a so-called dual type gas generator including two igniters, and includes a housing 1, an inner cylinder member of structure 4, a partition member of structure 5, a filter 6, a first igniter 10, and a second igniter 20. The space inside the housing 1 is divided by the partition member 5 into: a first combustion chamber 11 in which the first igniter 10 and a first gas generating agent 110 are accommodated; and a second combustion chamber 12 in which the second igniter 20 and a second gas generating agent 120 are accommodated, and in the partition member 5, a communication hole 15 that communicate with the first combustion chamber 11 and the second combustion chamber 12 is formed.

The gas generator 100 is configured to cause the gas generating agent filled in each combustion chamber to be combusted by the first igniter 10 and the second igniter 20, and release the combustion gas, which is the combustion product, from gas discharge ports 13 formed in the housing 1. The gas generator 100 further includes a single closing member or structure or a closure shown in FIG. 1 with reference numeral 9. The details will be described later, but the closing member 9 covers the entire communication hole 15 from the first combustion chamber 11 side to obtain a state in which the communication hole 15 is closed (hereinafter referred to as a closed state). Each configuration of the gas generator 100 will be described below.

[Housing]

The housing 1 is formed in a short cylindrical shape with both ends in an axial direction closed by joining an upper shell 2 and a lower shell 3 each formed of metal and each formed to be a bottomed substantially cylindrical shape in a state where the respective opening ends face each other. Here, a direction along the axial direction of the housing 1 is defined as a vertical direction of the gas generator 100, where the upper shell 2 side (i.e., the upper side in FIG. 1) is defined as an upper side of the gas generator 100, and the lower shell 3 side (i.e., the lower side in FIG. 1) is defined as a lower side of the gas generator 100.

The upper shell 2 has an upper peripheral wall portion 21 in a cylindrical shape and a top plate portion 22 that closes the upper end of the upper peripheral wall portion 21, thereby forming an internal space. The internal space of the upper shell 2 is filled with the first gas generating agent 110. The top plate portion 22 has a generally circular shape when viewed from above. The upper peripheral wall portion 21 extends generally perpendicularly from the circumferential edge of the top plate portion 22 to form a peripheral wall having a cylindrical shape. The top plate portion 22 is connected to the upper end side of the upper peripheral wall portion 21, and a fitting wall portion 24 is connected to the lower end side of the upper peripheral wall portion 21 by way of an abutment portion 23. An opening portion of the upper shell 2 is formed by a lower end portion of the fitting wall portion 24. In addition, the inner diameter of the fitting wall portion 24 is set to be larger than the inner diameter of the upper peripheral wall portion 21.

The lower shell 3 has a lower peripheral wall portion 31 having a cylindrical shape and a bottom plate portion 32 that closes the lower end of the lower peripheral wall portion 31, thereby forming an internal space. The internal space of the lower shell 3 is filled with the second gas generating agent 120. Similar to the top plate portion 22 of the upper shell 2, the bottom plate portion 32 has a generally circular shape when viewed from above. Furthermore, the bottom plate portion 32 is provided with a first fitting hole 321, in which the first igniter 10 is fixed, and a second fitting hole 322, in which the second igniter 20 is fixed. The lower peripheral wall portion 31 extends generally perpendicularly from the circumferential edge of the bottom plate portion 32 to form a peripheral wall having a cylindrical shape. The bottom plate portion 32 is connected to the lower end side of the lower peripheral wall portion 31, and an opening portion of the lower shell 3 is formed by the upper end portion of the lower peripheral wall portion 31. The outer diameter of the lower peripheral wall portion 31 is formed to be generally the same as the inner diameter of the fitting wall portion 24 of the upper shell 2, and the lower peripheral wall portion 31 is fitted into the fitting wall portion 24 of the upper shell 2.

The upper peripheral wall portion 21 of the upper shell 2 and the lower peripheral wall portion 31 of the lower shell 3 form a peripheral wall portion having a cylindrical shape that connects the top plate portion and the bottom plate portion in the housing 1. In other words, the housing 1 is configured to have a peripheral wall portion having a cylindrical shape, a top plate portion 22 that closes one end portion of the peripheral wall portion, and a bottom plate portion 32 that defines, by closing the other end portion, the internal space of the housing 1 together with the peripheral wall portion and the top plate portion 22.

A plurality of the gas discharge ports 13 are formed side by side in a circumferential direction in the upper peripheral wall portion 21 of the upper shell 2. The gas discharge port 13 is closed by a sealing tape 14. As the sealing tape 14, aluminum foil or the like having one side coated with an adhesive member is used. Thus, the airtightness of the housing 1 is ensured.

[Inner Cylinder Member]

The inner cylinder member 4 is a cylindrical member in which the first igniter 10 is accommodated inside. The inner cylinder member 4 also functions as an engaged member that holds the closing member 9 by engaging with the closing member 9. The inner cylinder member 4 includes a base end portion 41 joined to the bottom plate portion 32 of the lower shell 3; a peripheral wall portion 42 connecting to the base end portion 41 and extending upward from the base end portion 41; a connecting portion 43 connecting to the peripheral wall portion 42; a fitting portion 44 connecting to the connecting portion 43 and having a reduced diameter than that of the peripheral wall portion 42 to extend upward from the connecting portion 43; and a distal end portion 45 connecting to the fitting portion 44, bent and terminated on the inner side from the fitting portion 44, and forming an opening portion of the inner cylinder member 4 by the end edge thereof. As illustrated in FIG. 1, the inner cylinder member 4 is fixed to the bottom plate portion 32 such that the base end portion 41 abuts against the vicinity of the first fitting hole 321 in the bottom plate portion 32 of the lower shell 3, and that the first igniter 10 fixed to the first fitting hole 321 is accommodated within the inner cylinder member 4, and the peripheral wall portion 42 and the fitting portion 44 are in a state of being extended upward toward the top plate portion 22 of the upper shell 2.

[Partition Member]

The partition member 5 is a member that defines the first combustion chamber 11 and the second combustion chamber within the housing 1. The partition member 5 includes: a dividing wall portion 51 having a disc-shape and extending in a direction generally orthogonal to the axial direction of the housing 1 and dividing the internal space of the housing 1 up and down; a fitting wall portion 52 having a cylindrical shape, connecting to the dividing wall portion 51, and extending upward from the circumferential edge of the dividing wall portion 51 along the inner circumferential surface of the lower peripheral wall portion 31 of the lower shell 3; and a terminating portion 53 connecting to the fitting wall portion 52 and extending from an upper end of the fitting wall portion 52 to an outer side of the housing 1 in a radial direction. As illustrated in FIG. 1, the terminating portion 53 is disposed on the upper end surface of the lower peripheral wall portion 31 of the lower shell 3, and thus the partition member 5 is supported by the lower shell 3.

As illustrated in FIG. 1, the internal space of the housing 1 is divided by the partition member 5 into: the first combustion chamber 11 located on the top plate portion 22 side (upper side) in the axial direction of the housing 1; and the second combustion chamber 12 located on the bottom plate portion 32 side (lower side) in the axial direction of the housing 1. The first combustion chamber 11 is in communication with the outside of the housing 1 (that is, outside of the gas generator 100) through the gas discharge ports 13. In addition, a through-hole 511 through which the inner cylinder member 4 passes is formed in the dividing wall portion 51. Furthermore, the inner cylinder member 4 passes through the through-hole 511 and thus a part of the fitting portion 44 and the distal end portion 45 project out into the first combustion chamber 11, and the internal space of the inner cylinder member 4 connects with the internal space of the upper peripheral wall portion 21 of the upper shell 2 through the opening portion formed in the distal end portion 45, thereby forming a part of the first combustion chamber 11.

The first combustion chamber 11 accommodates the first igniter 10 and the first gas generating agent 110 that is combusted by the operation of the first igniter 10. The first igniter 10 is fixed to the first fitting hole 321 of the lower shell 3, and is in a state of being disposed within the inner cylinder member 4 so as not to project out from the opening portion of the inner cylinder member 4 toward the top plate portion 22. Furthermore, a retainer 7 that biases the first gas generating agent 110 is disposed between the top plate portion 22 and the first gas generating agent 110 in the first combustion chamber 11 to suppress the vibration of the first gas generating agent 110. The second combustion chamber 12 accommodates the second igniter 20 and the second gas generating agent 120 that is combusted by the operation of the second igniter 20. The second igniter 20 is fixed to the second fitting hole 322 of the lower shell 3. A retainer 8 that biases the second gas generating agent 120 is disposed between the partition members 5 and the second gas generating agent 120 in the second combustion chamber 12 to suppress the vibration of the second gas generating agent 120.

[Igniter]

The first igniter 10 and the second igniter 20 combust an ignition charge contained inside the metallic cup bodies C1, C2, and release the combustion product to the outside, thereby combusting the first gas generating agent 110 and the second gas generating agent 120. Note that the igniter according to the present disclosure may include an ignition charge separately disposed on the outside of the cup body.

[Gas Generating Agent]

The first gas generating agent 110 uses a gas generating agent having a relatively low combustion temperature. The combustion temperature of the first gas generating agent 110 is desirably within a range from 1000 to 1700° C., and for example, a single-hole circular columnar gas generating agent may be used, including guanidine nitrate (41 wt. %), basic copper nitrate (49 wt. %), and a binder and an additive. Furthermore, the second gas generating agent 120 may be identical to the first gas generating agent 110. However, the first gas generating agent 110 and the second gas generating agent 120 are not limited to those described above. The first gas generating agent 110 and the second gas generating agent 120 may be gas generating agents of an identical type, an identical shape, and an identical dimension, or may be gas generating agents of different types, different shapes, or different dimensions.

[Communication Hole]

Here, as illustrated in FIG. 1, the inner diameter of the through-hole 511 through which the fitting portion 44 of the inner cylinder member 4 passes in the partition member 5 is set to be greater than the outer diameter of the fitting portion 44. Thus, an annular gap surrounding the inner cylinder member 4 is formed between the outer circumferential surface of the inner cylinder member 4 and the inner wall of the through-hole 511. The gap forms the communication hole 15 that communicates the first combustion chamber 11 and the second combustion chamber 12.

[Filter]

As illustrated in FIG. 1, the filter 6 is provided inside the housing 1 for cooling and filtering combustion gas generated in the first combustion chamber 11 and the second combustion chamber 12. The filter 6 has a cylindrical shape and is disposed between the first combustion chamber 11 and the gas discharge port 13 such that the first combustion chamber 11 is contained on the inner side of the filter 6 and that the gas discharge port 13 is located on the outer side of the filter 6. The filter 6 is configured to allow combustion gas to pass through, and cools the combustion gas passing therethrough and collects the combustion residue to filter the combustion gas. The filter 6 is provided in the housing 1 such that the central axis thereof is parallel with the axial direction of the housing 1, one end portion is supported by the top plate portion 22 of the upper shell 2, and the other end portion is supported by the dividing wall portion 51 of the partition member 5. As a result, a state is obtained in which the first gas generating agent 110 accommodated in the first combustion chamber 11 is surrounded by the filter 6 in the radial direction of the housing 1. An annular gap 16 is formed between the filter 6 and the upper peripheral wall portion 21 in which the gas discharge ports 13 are formed.

[Closing Member]

The closing member 9 is formed by a single member and covers the entire communication hole 15 from the first combustion chamber 11 side as illustrated in FIG. 1 and thus the communication hole 15 is in a closed state before the second igniter 20 is actuated, and the closing member 9 opens the entire communication hole 15 when the entire closing member 9 separates from the communication hole 15 by the combustion pressure when the second igniter 20 is actuated and the second gas generating agent 120 is combusted. The structure of the closing member 9 will be described below.

Figure 2:
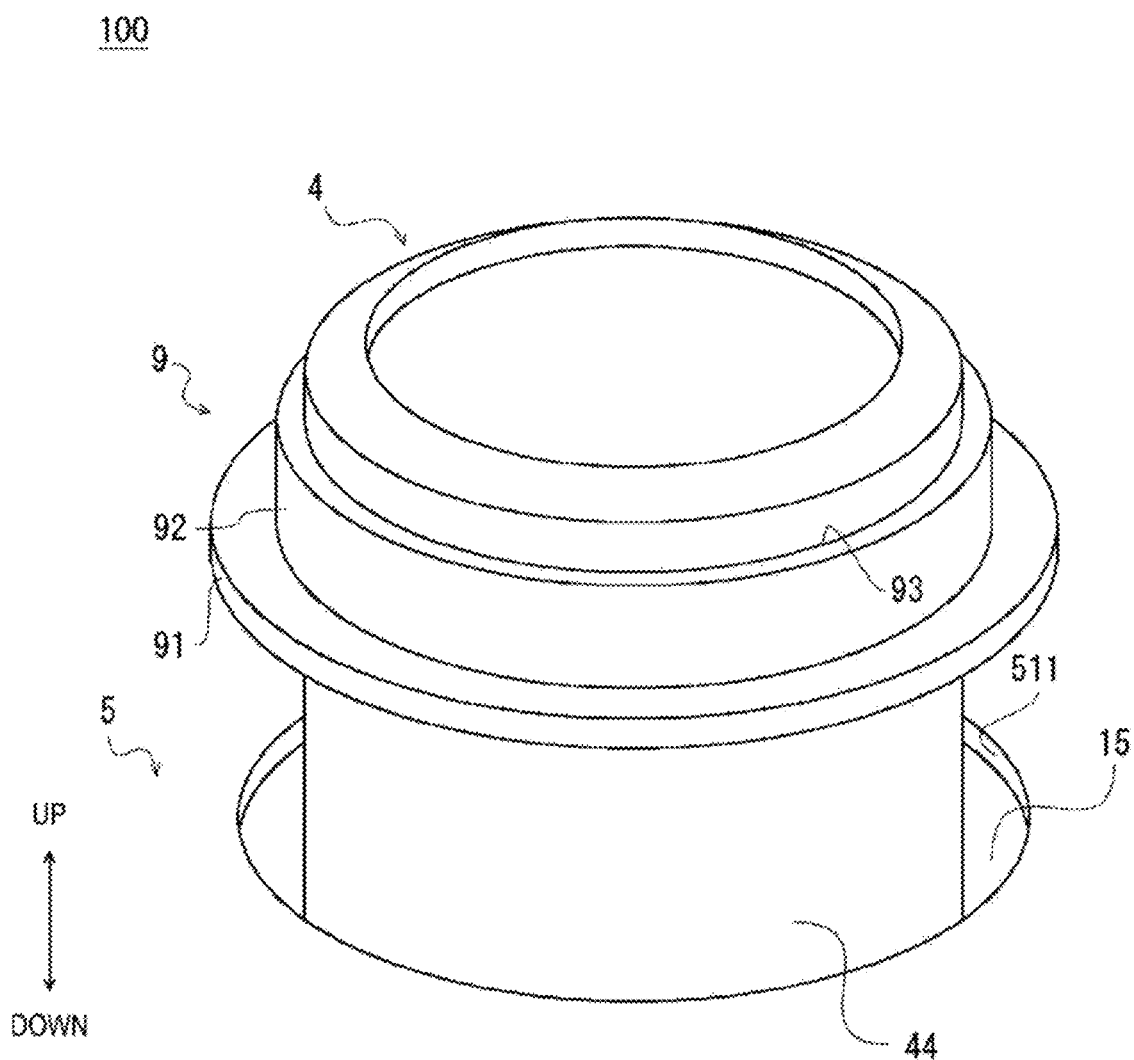
FIG. 2 is a perspective view of an internal structure of the gas generator according to the first embodiment.

FIG. 2 is a perspective view of the internal structure of the gas generator 100. FIG. 2 illustrates a state in which a closed state of the communication hole 15 is released. As illustrated in FIG. 2, the closing member 9 is formed by integrating an annular portion 91 having an annular shape and a cylindrical portion 92 having a cylindrical shape, which is provided coaxially with the annular portion 91 and has a smaller outer diameter than the annular portion 91. The cylindrical portion 92 extends from the inner circumferential edge of the annular portion 91 toward the distal end side (upper side) of the inner cylinder member 4, and is formed with an insertion hole 93 that passes through the closing member 9 along the axial direction by the inner circumferential surface of the annular portion 91 and the inner circumferential surface of the cylindrical portion 92 continuing to each other. The inner cylinder member 4 is inserted into the insertion hole 93 and thus the axial direction of the inner cylinder member 4 generally matches the axial direction of the closing member 9. More specifically, the inner cylinder member 4 is fitted with the insertion hole 93 at the fitting portion 44. The fitting of the inner cylinder member 4 with the insertion hole 93 is an interference fit or a press-fit.

Figure 3:
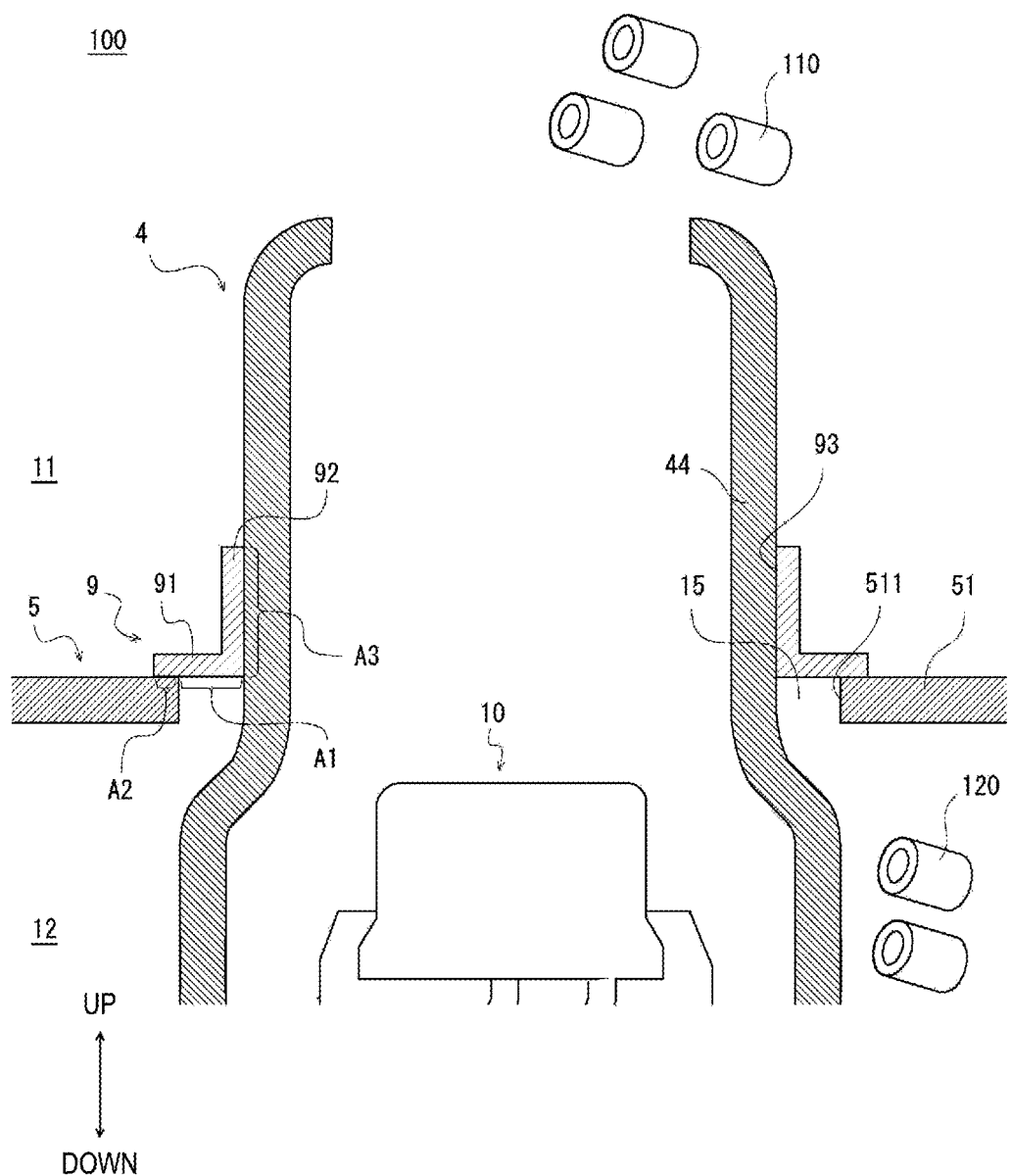
FIG. 3 is an axial cross-sectional view of the internal structure of the gas generator according to the first embodiment in a closed state.
Figure 4:
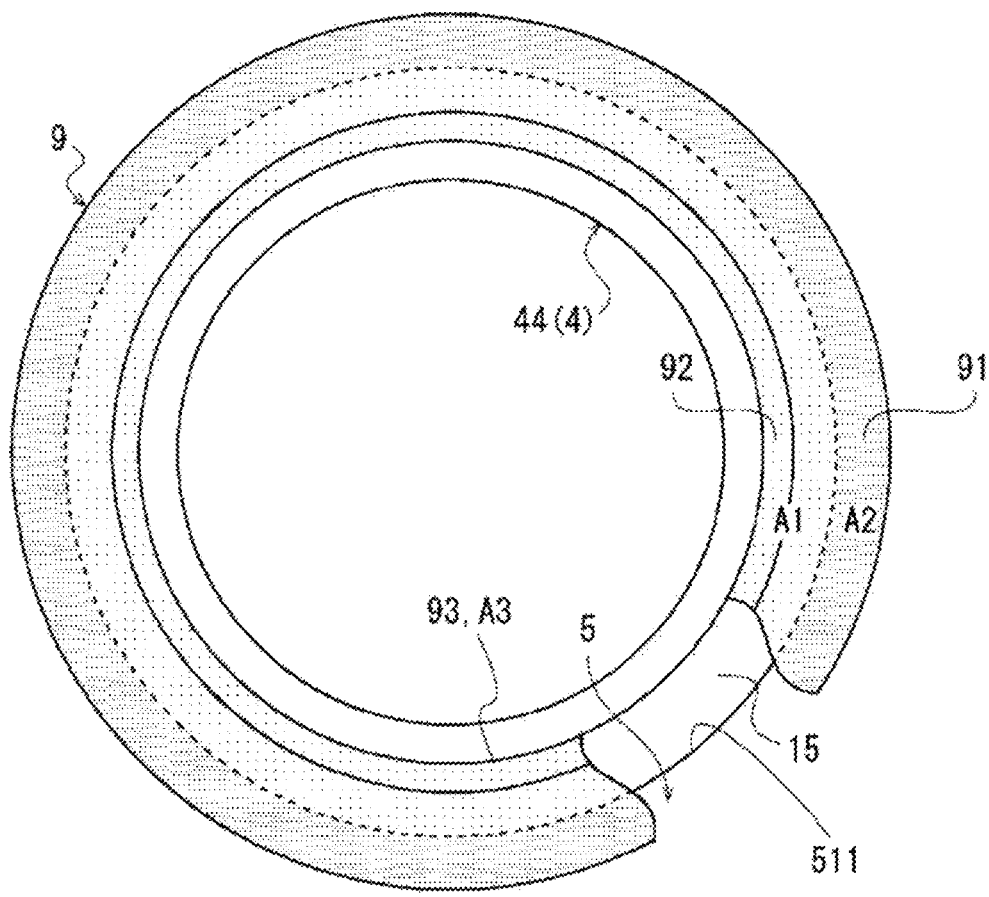
FIG. 4 is a top view of the internal structure of the gas generator according to the first embodiment in the closed state.

FIGS. 3 and 4 are views for describing the closed state before the gas generator 100 is actuated; FIG. 3 is an axial cross-sectional view of the internal structure of the gas generator 100 in the closed state, and FIG. 4 is a top view of the internal structure of the gas generator 100 in the closed state. In FIG. 4, a state as viewed from the first combustion chamber 11 side is illustrated. Before each igniter is actuated, as illustrated in FIGS. 3 and 4, the communication hole 15 is in the closed state by the closing member 9 covering the entire communication hole 15 from the first combustion chamber 11 side. Here, as described above, the inner cylinder member 4 and the insertion hole 93 are fitted without any gap, and the outer diameter of the annular portion 91 of the closing member 9 is set to be larger than the inner diameter of the through-hole 511. Thus, the closing member 9 is formed with: a first region or surface A1 that is exposed on the second combustion chamber 12 side by covering the communication hole 15 from the first combustion chamber 11 side in the closed state; and a second region or surface A2 that comes into contact with the partition member 5 from the first combustion chamber 11 side by being placed on the dividing wall portion 51 of the partition member 5 in the closed state. In FIG. 4, the distinction between the first region A1 and the second region A2 is indicated by differences in dot patterns: Note that the state of being exposed on the second combustion chamber 12 side refers to a state where the first region A1 is not covered with respect to the second combustion chamber 12, and where the combustion gas from within the second combustion chamber 12 may come into contact with the first region A1. Pressure from the second combustion chamber 12 side can be applied to the first region A1 by exposing the first region A1 to the second combustion chamber 12 side in the closed state.

Furthermore, as illustrated in FIG. 3, according to the fitting of the inner cylinder member 4 and the insertion hole 93, the inner wall of the insertion hole 93 into which the inner cylinder member 4 is inserted forms an engagement region or surface A3 that engages with the inner cylinder member 4 serving as the engaged member or structure in the closed state. In the closed state, the engagement region A3 engages with the inner cylinder member 4 and thus the closing member 9 is in a state of being held by the inner cylinder member 4.

Such closing member 9 may be formed to a single member by a single continuous member, or may be formed to a single member as a whole by combining a plurality of members. The material of the closing member 9 is not particularly limited, but examples thereof include stainless steel, iron, and the like.

[Assembly]

In the assembly of the gas generator 100, the first igniter 10 is fixed to the first fitting hole 321 of the lower shell 3, and the second igniter 20 is fixed to the second fitting hole 322. Then, the inner cylinder member 4 is disposed on the bottom plate portion 32 of the lower shell 3 and thus the first igniter 10 is accommodated in the inner cylinder member 4. With the inner cylinder member 4 disposed in such a manner, the second combustion chamber 12 having an annular shape is formed and surrounds a periphery of the inner cylinder member 4, and the second gas generating agent 120 is filled therein. When the second gas generating agent 120 is filled, the retainer 8 is attached, and furthermore, the terminating portion 53 of the partition member 5 is disposed on the upper end surface of the lower peripheral wall portion 31 of the lower shell 3, and the partition member 5 is attached to the lower shell 3 and the inner cylinder member 4 and thus the fitting portion 44 of the inner cylinder member 4 passes through the through-hole 511 of the partition member 5.

After the partition member 5 is attached to the lower shell 3 and the inner cylinder member 4, the inner cylinder member 4 is press-fitted into the insertion hole 93 of the closing member 9, and the annular portion 91 of the closing member 9 is abutted against the through-hole 511 of the dividing wall portion 51. As a result, the closing member 9 is attached and thus the communication hole 15 is in the closed state.

After the closing member 9 is attached, the filter 6 is assembled. The outer diameter of the filter 6 before the assembly is formed to be slightly larger than the inner diameter of the fitting wall portion 52 of the partition member 5, and the filter 6 is disposed on the dividing wall portion 51 by being press-fitted into the fitting wall portion 52. In this state, the inner side of the filter 6 is filled with the first gas generating agent 110, and the upper shell 2 is attached after being fixed by the retainer 7. As described above, since the outer diameter of the lower peripheral wall portion 31 of the lower shell 3 is formed to be generally identical to the inner diameter of the fitting wall portion 24 of the upper shell 2, the lower peripheral wall portion 31 is fitted into the fitting wall portion 24 until the abutment portion 23 of the upper shell 2 abuts the terminating portion 53 of the partition member 5. In the state where the abutment portion 23 of the upper shell 2 is abutted to the terminating portion 53 of the partition member 5, the fitting wall portion 52 of the partition member 5 is fitted in the lower peripheral wall portion 31 of the lower shell 3. Note that, in the housing 1, the contacting sites of the upper shell 2 and the lower shell 3 are joined by a joining method (for example, welding or the like) favorable for damp-proofing of the gas generating agent with which the interior is filled, or the like. The gas generator 100 is thereby assembled.

[Gas Generator]

As described above, the gas generator 100 is configured as a dual type gas generator including two igniters (first igniter 10 and second igniter 20). In the gas generator 100, when a sensor (not illustrated) senses an impact, a predetermined signal is sent to each igniter, and thus the first igniter 10 actuates, and the second igniter 20 actuates after the actuation timing of the first igniter 10. The gas generator 100 can generate a relatively large amount of combustion gas by the combustion of the first gas generating agent 110 by actuation of the first igniter 10 and the combustion of the second gas generating agent 120 by actuation of the second igniter 20, and release the combustion gas to the outside from the gas discharge port 13. In the present embodiment, the second igniter 20 operates independently of the first igniter 10, and when actuated, operates at a predetermined timing after the operation of the first igniter 10. The combustion timing of the gas generating agent in each combustion chamber is correlated with the release timing of the combustion gas to the outside. That is, the releasing characteristics of the combustion gas are correlated with the combustion timing of each gas generating agent. Thus, the actuation timing of each igniter is determined in accordance with the releasing characteristics of the combustion gas demanded on the gas generator 100. Note that the second igniter 20 is not always operated, and may also operate simultaneously with the first igniter 10. In response to the impact sensed by the sensor (not illustrated), the gas generator 100 can actuate only the first igniter 10 without actuating the second igniter 20 when the impact is weak, or can simultaneously actuate the first igniter 10 and the second igniter 20 when the impact is strong.

Operation Example

The closing member 9 according to the present embodiment is configured such that a closed state of the communication holes 15 is maintained with respect to the combustion of the first gas generating agent 110, and that a closed state of the communication holes 15 is released with respect to the combustion of the second gas generating agent 120. The functions of the closing member 9 will be described below together with the operation of the gas generator 100. Here, a case in which the second igniter 20 is actuated after the first igniter 10 (that is, after the first igniter 10 has been actuated) will be described.

Before the gas generator 100 is actuated, that is, in a state where neither igniter has yet been actuated, the communication hole 15 is in the closed state, as illustrated in FIG. 3. In this state, movement of the closing member 9 is inhibited by the first gas generating agent 110 filled into the first combustion chamber 11, thereby maintaining the closed state of the communication hole 15. When the first igniter 10 is actuated from this state, the first gas generating agent 110 is combusted, whereby high-temperature and high-pressure gas is generated in the first combustion chamber 11. This combustion gas passes through the filter 6, and thus the filter 6 cools the combustion gas and filters the combustion residue. The combustion gas cooled and filtered by the filter 6 passes through the gap 16, ruptures the sealing tape 14 and is released from the gas discharge port 13 to the outside of the housing 1.

Figure 5:
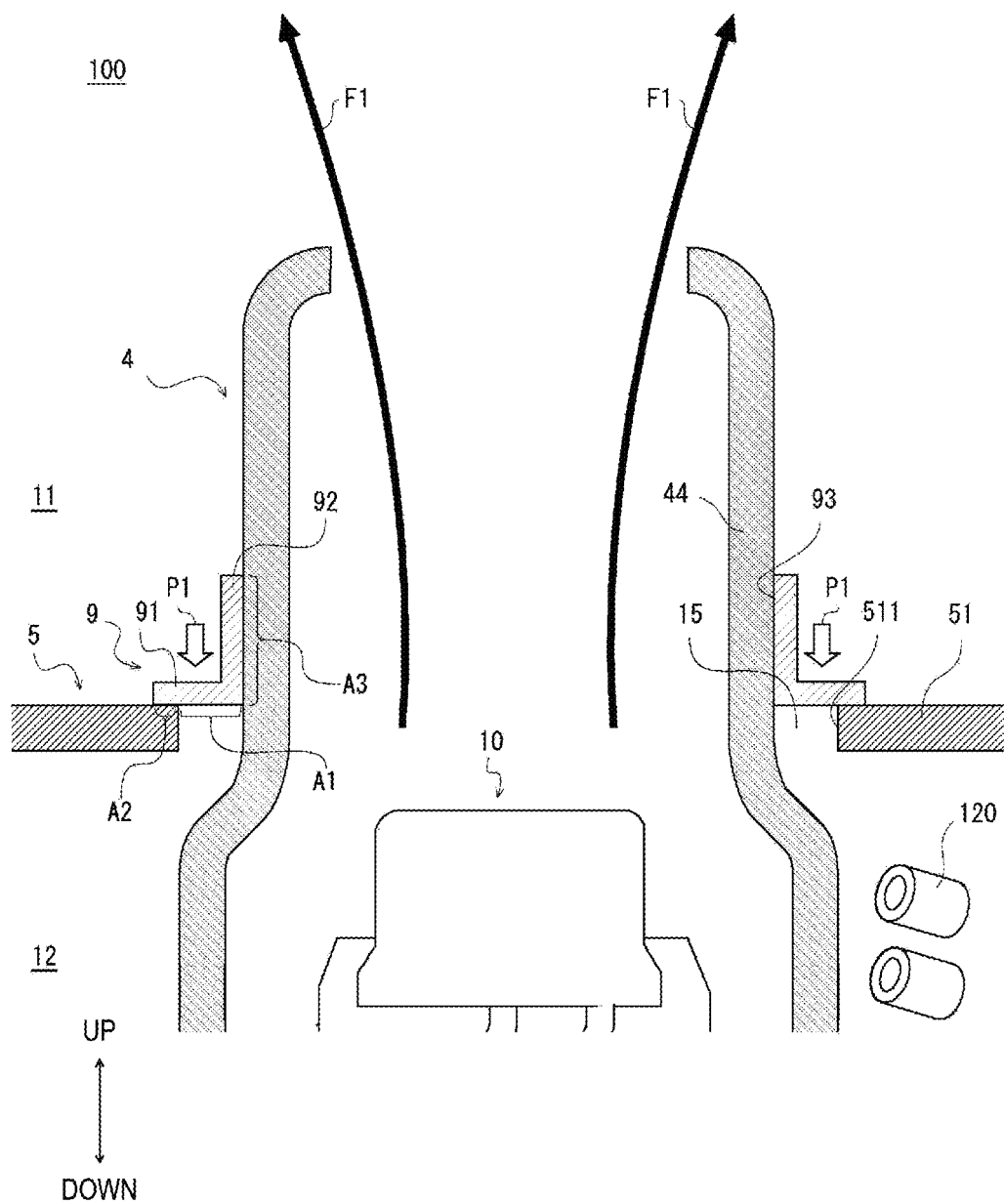
FIG. 5 is a diagram illustrating a state when a first igniter is actuated from the state illustrated in FIG. 3.

FIG. 5 is a diagram illustrating a state when the first igniter 10 is actuated from the state illustrated in FIG. 3. In the drawings, the arrow indicated by reference numeral F1 indicates the flow of the combustion gas from the first gas generating agent 110 present in the inner cylinder member 4, and the arrow indicated by reference numeral P1 indicates the pressure caused by the combustion of the first gas generating agent 110 (hereinafter referred to as the combustion pressure). As illustrated in FIG. 5, the first igniter 10 is actuated and the first gas generating agent 110 is combusted, and thus the combustion pressure P1 generated thereby acts on the closing member 9. At this time, the second region A2 in contact with the partition member 5 is pressed against the partition member 5 by the combustion pressure P1. Thus, the closing member 9 is supported by the partition member 5 in the second region A2, and the closed state of the communication hole 15 is maintained.

Figure 6:
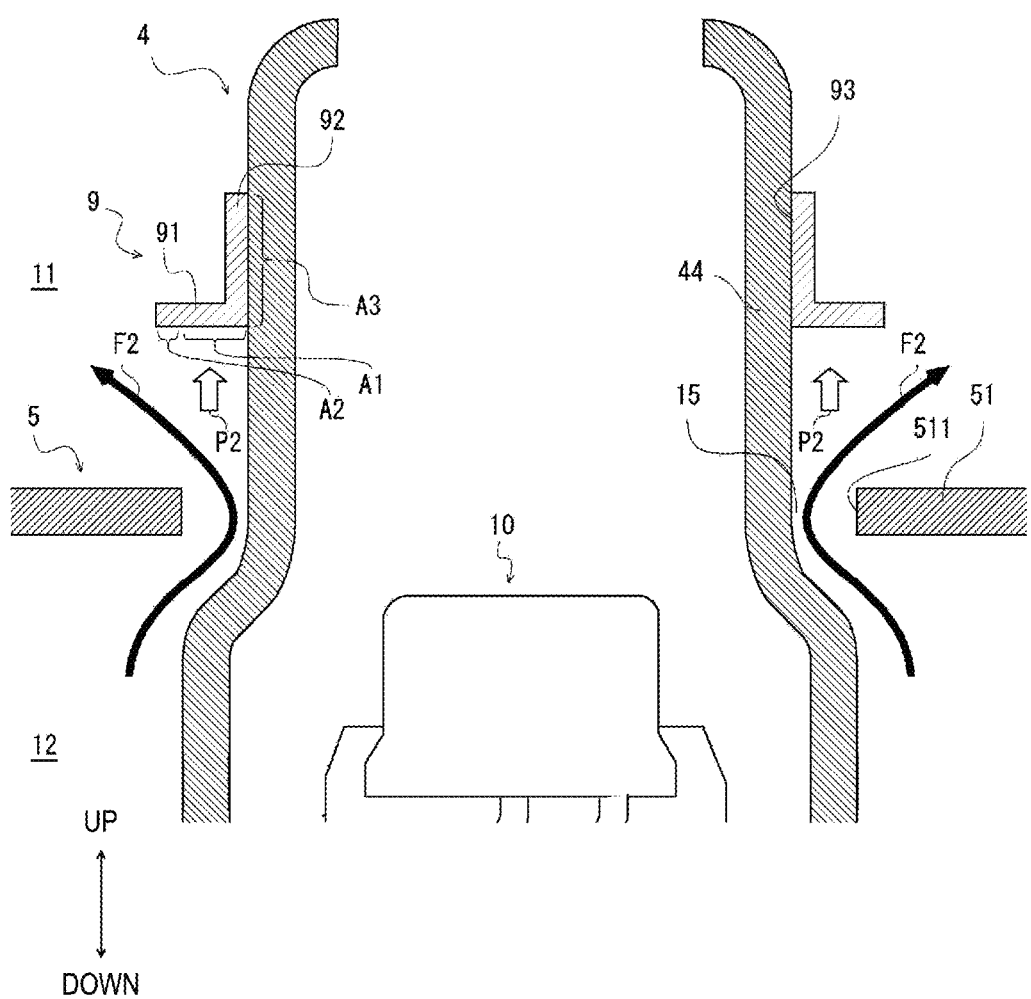
FIG. 6 is a diagram illustrating a state when a second igniter is actuated from the state illustrated in FIG. 5.

Next, when the second igniter 20 is actuated after the actuation of the first igniter 10, the second gas generating agent 120 is combusted, whereby high-temperature and high-pressure combustion gas is generated in the second combustion chamber 12. FIG. 6 is a diagram illustrating a state when the second igniter 20 is actuated from the state illustrated in FIG. 5. In the drawing, the arrow indicated by reference numeral F2 indicates the flow of the combustion gas from the second gas generating agent 120, and the arrow indicated by reference sign P2 indicates the combustion pressure of the second gas generating agent 120 acting on the closing member 9. As illustrated in FIG. 5, in the closed state, the first region A1 of the closing member 9 is exposed in the second combustion chamber 12, so the combustion pressure P2 of the second, gas generating agent 120 acts on the first region A1. The combustion pressure P2 acts in a direction of moving the closing member 9 upward (in a direction from the second combustion chamber 12 side toward the first combustion chamber 11 side). Here, in the gas generator 100, the engagement region A3 engages with the inner cylinder member 4 as the combustion pressure P2 acts on the first region A1 thus releasing the holding of the closing member 9 by the inner cylinder member 4. More specifically, the fitting between the insertion hole 93 and the inner cylinder member 4 is set to a degree that the combustion pressure P2 acting on the first region A1 allows the closing member 9 to move or slide along the axial direction of the inner cylinder member 4. Thus, the closing member 9 moves or slides upward while being guided by the inner cylinder member 4 by the combustion pressure P2 acting on the first region A1 from the second combustion chamber 12 side. As a result, the entire closing member 9 is separated from the communication hole 15, and hence the first region A1 included in the closing member 9 is also separated from the communication hole 15. As a result, the closed state is released, and the entire communication hole 15 is opened.

The combustion gas of the second gas generating agent 120 moves from the second combustion chamber 12 to the first combustion chamber 11 through the opened communication hole 15, is cooled and filtered by the filter 6, and then passes through the gap 16, and is released to the outside of the housing 1 through the gas discharge ports 13. This gap 16 that has been formed to surround the filter 6 allows the combustion gas to readily pass through the entire region of the filter 6, and thus effective utilization of the filter 6 and effective cooling and filtration of the combustion gas are achieved. The combustion gas of the first gas generating agent 110 and the second gas generating agent 120 flows into the airbag (not illustrated) after being released to the outside of the housing 1. This causes the airbag to inflate, forming a cushion between the occupant and the rigid structure and protecting the occupant from the impact. As described above, a series of operations of the gas generator 100 is completed.

[Operations and Effects]

As described above, in the gas generator 100, the closing member 9 is configured such that the closing member 9 is supported by the partition member 5 in the second region A2 by the combustion pressure of the first gas generating agent 110, and thus the communication hole 15 is in the closed state. As a result, the combustion gas of the first gas generating agent 110 is suppressed from flowing into the second combustion chamber 12 from the first combustion chamber 11 through the communication holes 15, and an event in which the second gas generating agent 120 is combusted by the combustion gas of the first gas generating agent 110 can be prevented. In other words, the effect of preventing inflammation from the first combustion chamber 11 to the second combustion chamber 12 can be obtained. In particular, because the closing member 9 is pressed against the partition member 5, gaps are unlikely to occur between the closing member 9 and the partition member 5, and the effect of preventing inflammation is enhanced. As described above, the releasing characteristics of the combustion gas of the gas generator 100 are correlated with the combustion timing of each gas generating agent, but according to the gas generator 100, the second gas generating agent 120 can be combusted at a desired timing due to the actuation of the second igniter 20 by preventing inflammation.

Furthermore, in the gas generator 100, the closing member 9 is configured such that the entire closing member 9 is moved (displaced) in the direction from the second combustion chamber 12 side toward the first combustion chamber 11 side due to the combustion pressure of the second gas generating agent 120 acting on the first region A1, and thus the entire closing member 9 is separated from the communication hole 15 and the closed state is released. Here, the opening area of the communication hole 15 affects the manner of flowing, in the first combustion chamber 11, of the combustion gas that has flowed into the first combustion chamber 11 from the second combustion chamber 12, and is correlated with the releasing characteristics of the combustion gas of the gas generator 100. Additionally, the opening area can be set to adjust the combustion performance of the second gas generating agent 120. At this time, the combustion pressure P2 due to the combustion of the second gas generating agent 120 is not necessarily limited to uniformly acting on the first region A1, and the magnitude in pressure may be different for each location in the first region A1. In addition, even if the combustion pressure P2 acts uniformly, the magnitude of the load may be different for each location in the first region A1 depending on the shape of the communication hole 15. If the aspects of opening of the communication hole 15 differ depending on the presence or absence and degree of pressure unevenness and load unevenness, the opening area of the communication holes 15 will not be obtained with good reproducibility, and there is a concern that the releasing characteristics of the combustion gas may vary. In contrast, in the gas generator 100, by configuring the closing member 9 as a single member, the entire closing member 9 separates from the communication hole 15 by the combustion pressure of the second gas generating agent 120. Therefore, regardless of the presence or absence and degree of pressure unevenness and load unevenness, the communication hole 15 can be opened in an identical aspect. In other words, the opening area of the communication hole 15 can be obtained with good reproducibility. In particular, in a case of the present embodiment, the entire closing member 9 is configured to be separated from the communication hole 15, so the entire communication hole 15 can be uniformly opened.

As described above, according to the gas generator 100, the flow and pressure of the combustion gas inside the housing 1 can be controlled as desired, and the desired releasing characteristics can be obtained with good reproducibility.

Furthermore, in the gas generator 100, the insertion hole 93 and the inner cylinder member 4 are fitted and thus the closing member 9 is movable along the axial direction of the inner cylinder member 4 by the combustion pressure of the second gas generating agent 120 acting on the first region A1. Thus, the movement of the closing member 9 in a direction different from the axial direction of the inner cylinder member 4 is restricted. Therefore, when the communication hole 15 is in the closed state, the closing member 9 can be suppressed from shifting and the closed state can be more reliably maintained, and when the closed state of the communication hole 15 is released, the closing member 9 is guided by the inner cylinder member 4 and moves in a direction away from the communication hole 15, and the communication hole 15 can be more reliably opened.

Furthermore, in the gas generator 100, the communication hole 15 is formed as a gap formed between the outer circumferential surface of the inner cylinder member 4 and the inner wall of the through-hole 511. According to this configuration, by utilizing the through-hole 511 for passing the inner cylinder member 4 in the formation of the communication hole 15, the communication hole 15 may not be provided on the partition member 5 separately from the through-hole 511, and a tight tolerance design is not required for fitting the outer circumferential surface of the inner cylinder member 4 and the through-hole 511 without any gaps, whereby the gas generator can be easily manufactured. In addition, since the communication hole 15 is formed in an annular shape, the combustion pressure of the second gas generating agent 120 acts equally on the closing member 9, making it easier for the closing member 9 to move straight upward. As a result, the communication hole 15 can be more uniformly opened. Furthermore, by forming the communication hole 15 in an annular shape, a communication hole can be formed in a wider range compared to a case where the communication hole is formed in different shapes with an identical opening area. Thus, the flow of the combustion gas in the first combustion chamber 11 can be made more uniform. Note that, in the gas generator according to the present disclosure, a hole capable of communicating the first combustion chamber and the second combustion chamber may be provided in the inner cylinder member or the partition member, apart from the communication hole closed by the closing member described above, and the hole may be closed by the sealing tape that can be opened by the combustion pressure of the second gas generating agent. That is, the gas generator according to the present disclosure can improve the reproducibility of the releasing characteristics by the communication hole by closing the communication hole with the closing member, and does not exclude the presence of another communication hole closed by a sealing tape or the like.

Other Operation Examples

Figure 7:
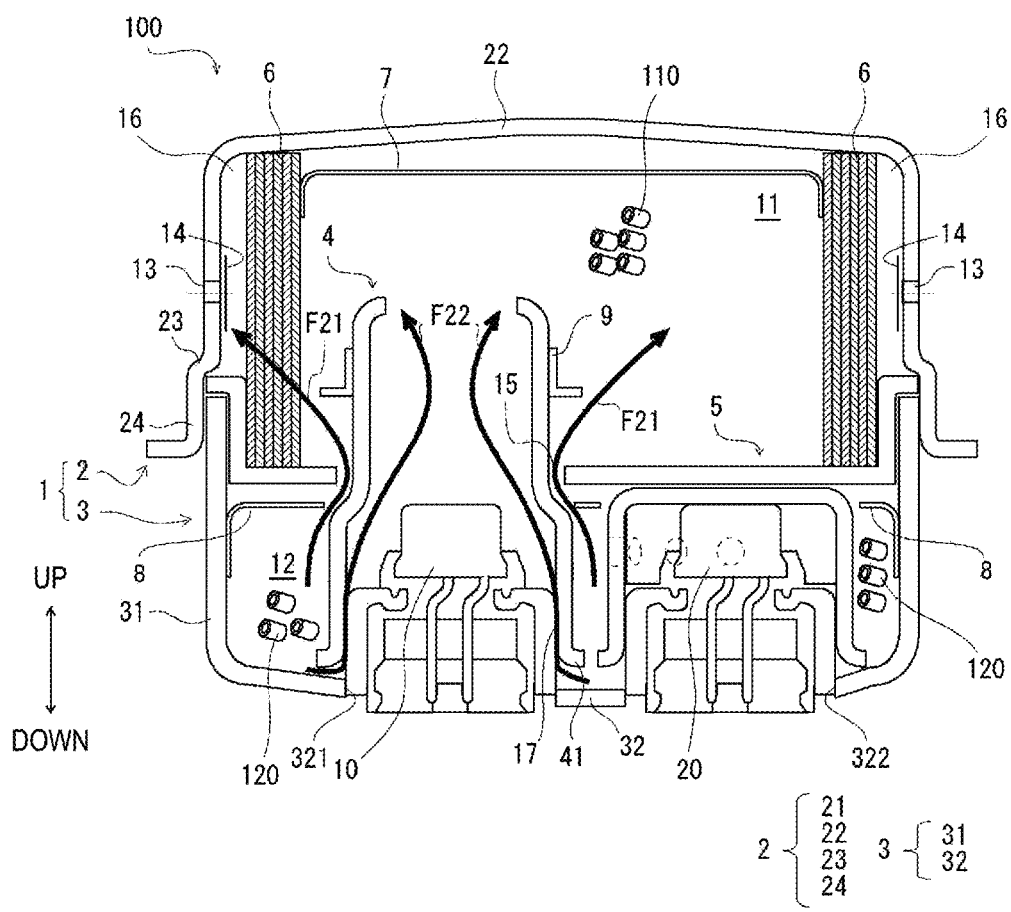
FIG. 7 is a diagram illustrating a state when the first igniter and the second igniter are simultaneously actuated from the state illustrated in FIG. 3.

As described above, in the gas generator 100, the closing member 9 is configured to cause the communication hole 15 to be in the closed state by the combustion pressure of the first gas generating agent 110, and to release the closed state by the combustion pressure of the second gas generating agent 120. Here, FIG. 7 is a diagram illustrating a state when the first igniter 10 and the second igniter 20 are simultaneously actuated from the state illustrated in FIG. 3. In FIG. 7, cross-sectional hatching is omitted. In the drawings, the arrows indicated by reference signs F21 and F22 indicate the flow path of the combustion gas of the second gas generating agent 120. When the first igniter 10 and the second igniter 20 are simultaneously actuated, immediately after the actuation, the movement of the closing member 9 is inhibited by the first gas generating agent 110 that is not yet combusted and is filled in the first combustion chamber 11, so the communication hole 15 is maintained in the closed state. On the other hand, when the first gas generating agent 110 and the second gas generating agent 120 are simultaneously ignited and both the first combustion chamber 11 and the second combustion chamber 12 are pressure-increased, the pressure inside the entire housing 1 increases greatly. Thus, the housing 1 deforms such that the central portion of the bottom plate portion 32 projects out toward the lower side, and the base end portion 41 of the inner cylinder member 4 separates from the bottom plate portion 32, and an annular gap 17 that communicates the inside of the inner cylinder member 4 and the second combustion chamber 12 is formed between the igniter 10 and the inner cylinder member 4. The combustion gas of the second gas generating agent 120 flows into the first combustion chamber 11 from the second combustion chamber 12 through the gap 17, thereby initiating combustion of the first gas generating agent 110 inside the first combustion chamber 11. As a result, the state in which the movement of the closing member 9 is inhibited by the unburned first gas generating agent 110 is released, and the closing member 9 becomes movable in a direction of separating from the communication hole 15 by the combustion pressure of the second gas generating agent 120. When the action of attempting to release the closed state by the combustion pressure of the second gas generating agent 120 exceeds the action of attempting to obtain the closed state by the combustion pressure of the first gas generating agent 110, the closed state is released and the communication hole 15 opens. As a result, as illustrated in FIG. 7, two flow paths, the flow path F21 passing through the communication holes 15 and the flow path F22 passing through the gap 17, are independently formed as a flow path for the combustion gas to reach the first combustion chamber 11 from the second combustion chamber 12, and thus the combustion gas can be rapidly released to the outside.

[First Variation]

Figure 8:
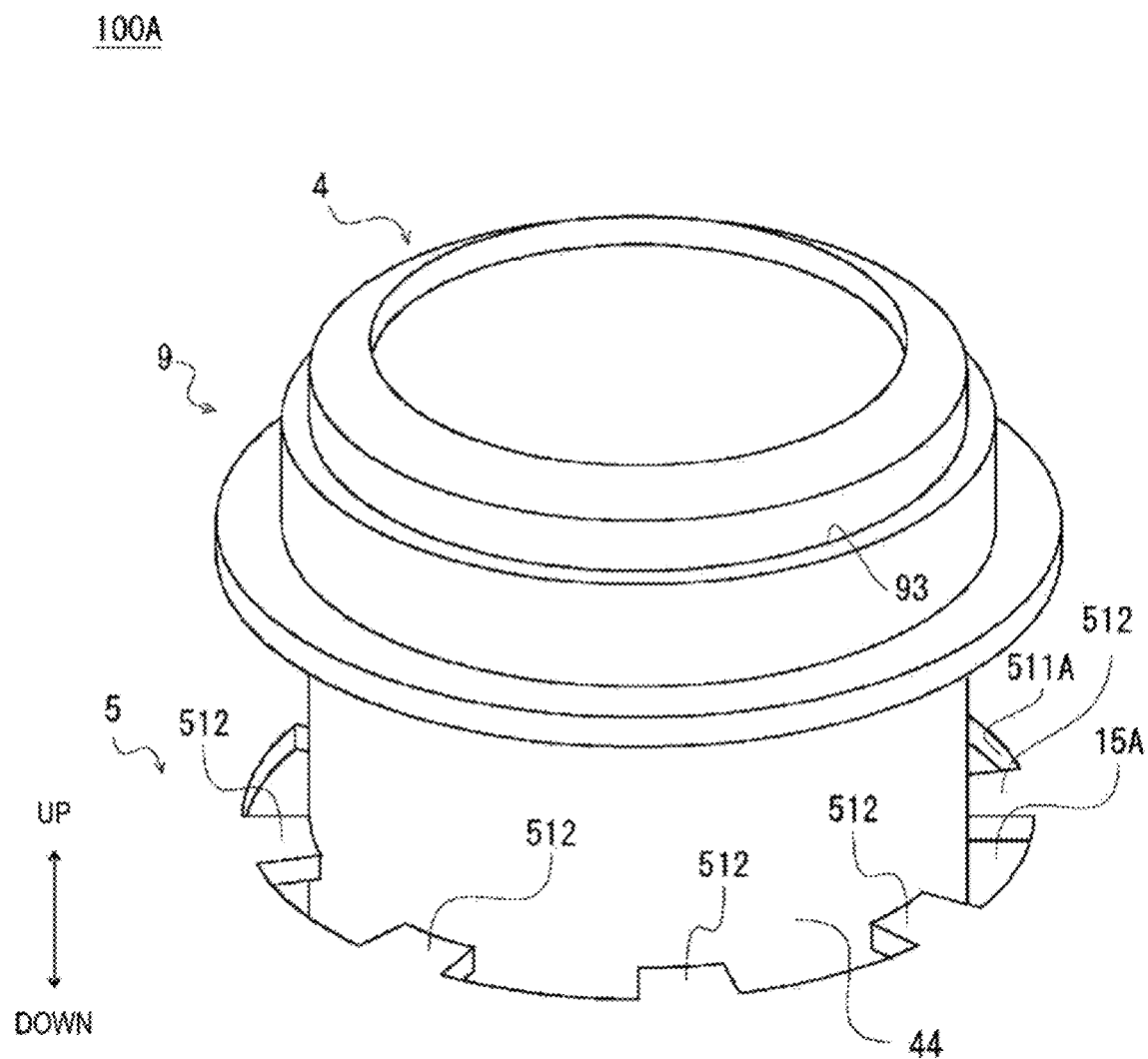
FIG. 8 is a perspective view of an internal structure of a gas generator according to a first variation of the first embodiment.

FIG. 8 is a perspective view of an internal structure of a gas generator 100A according to a first variation of the first embodiment. FIG. 8 illustrates a state in which the closed state of the communication hole 15 is released. As illustrated in FIG. 8, the gas generator 100A according to the first variation differs from the gas generator 100 illustrated in FIG. 2 in that the inner wall of the through-hole 511A of the partition member 5 is formed in a comb shape, but is otherwise generally the same. Hereinafter, the gas generator 100A according to the first variation will be described focusing on a difference from the gas generator 100, and the same reference signs will be denoted on parts similar to the gas generator 100 and a more detailed description will be omitted.

As illustrated in FIG. 8, in the gas generator 100A, a communication hole 15A is formed as a gap formed between the outer circumferential surface of the inner cylinder member 4 and the inner wall of a through-hole 511A. Here, as illustrated in FIG. 8, a plurality of projecting pieces or structures 512 projecting out toward an inner side of the through-hole 511A in the radial direction are formed in the inner wall of the through-hole 511A at equal intervals in the inner circumferential direction of the through-hole 511A and surround the inner cylinder member 4, and thus the inner wall of the through-hole 511A is formed in a comb shape as a whole. The distal end of each projecting piece 512 extends up to the outer circumferential surface of the inner cylinder member 4. However, the distal end of each projecting piece 512 may not come into contact with the outer circumferential surface of the inner cylinder member 4.

Figure 9:
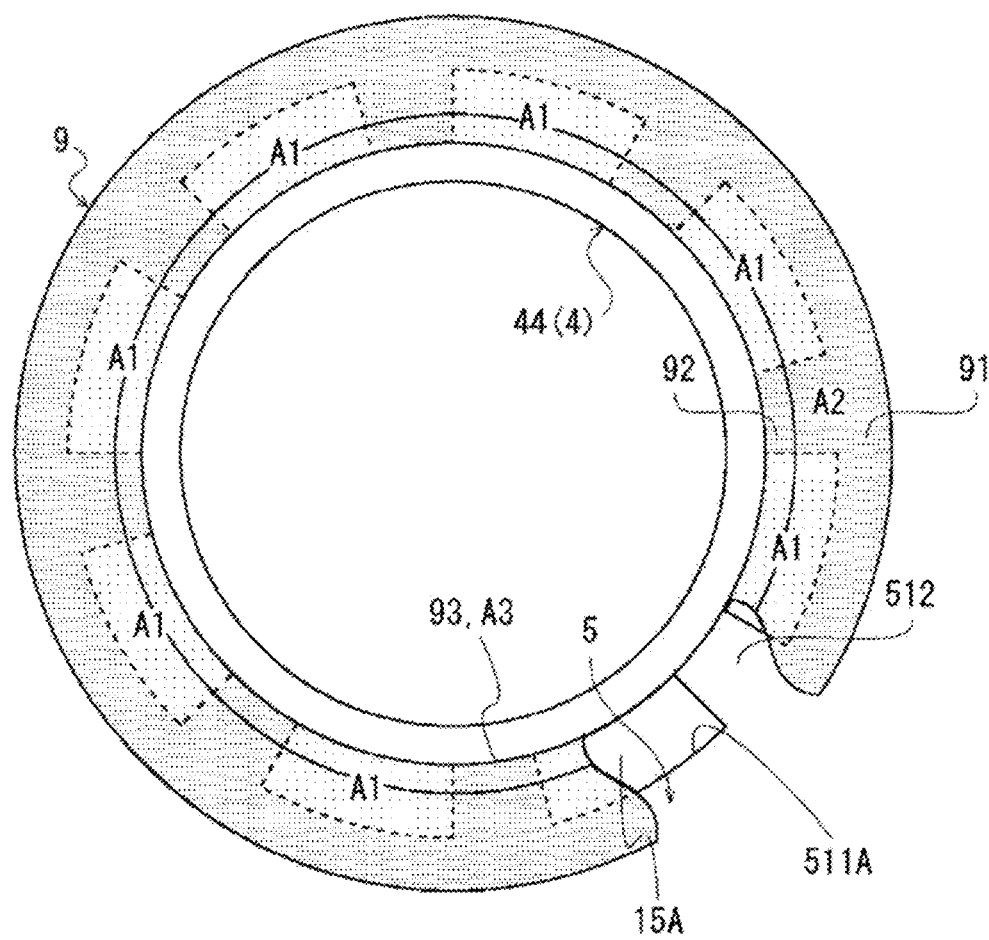
FIG. 9 is a top view of the internal structure of the gas generator according to the first variation of the first embodiment in a closed state.

FIG. 9 is a top view of the internal structure of the gas generator 100A in a closed state. As illustrated in FIG. 9, the communication hole 15A is in a closed state as the closing member 9 covers the entire communication hole 15A from the first combustion chamber 11 side. At this time, when the projecting piece 512 comes into contact with the closing member 9, the region in the closing member 9 that comes into contact with the projecting piece 512 forms the second region A2. In this way, in the gas generator 100A, the projecting pieces 512 that come into contact with the second region A2 in the closed state are formed on the inner wall of the through-hole 511A, and thus a large contact area for supporting the closing member 9 with respect to the combustion pressure of the first gas generating agent 110 can be ensured. As a result, the closing member 9 can be supported more securely, and deformation of the partition member 5 caused by the combustion pressure of the first gas generating agent 110 can be suppressed. Furthermore, in the present example, the plurality of projecting pieces 512 are formed at equal intervals in the inner circumferential direction of the through-hole 511A, and thus the combustion pressure of the second gas generating agent 120 acts equally with respect to the closing member 9, and the closing member 9 is suppressed from inclining and can be easily moved upward straightly. As a result, the communication hole 15A can be uniformly opened. However, the plurality of projecting pieces 512 may not be arranged at equal intervals. Additionally, the projecting piece 512 may not be formed in plurals, and only one projecting piece may be formed.

Second Variation

Figure 10:
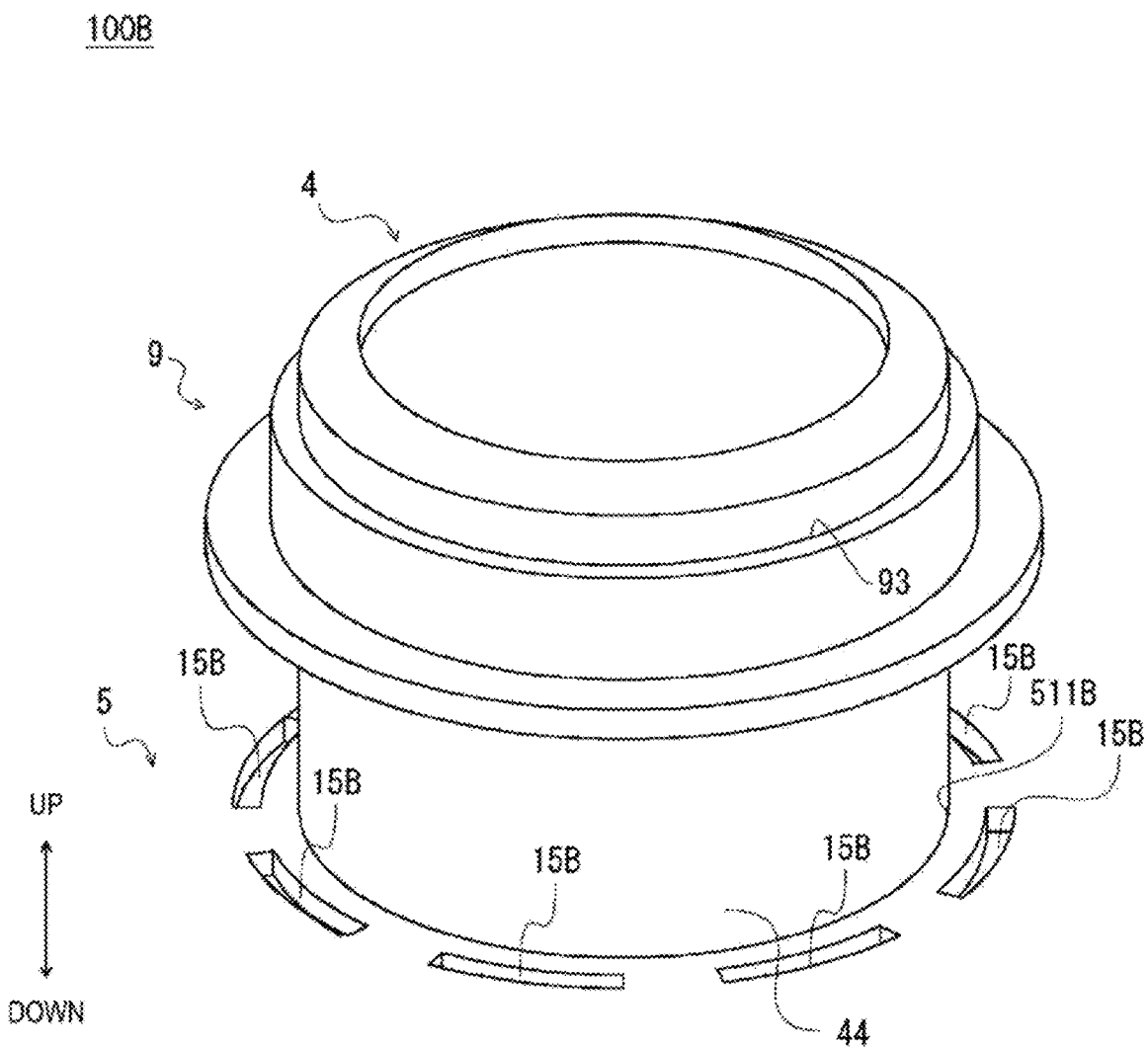
FIG. 10 is a perspective view of an internal structure of a gas generator according to a second variation of the first embodiment.

FIG. 10 is a perspective view of the internal structure of a gas generator 100B according to a second variation of the first embodiment. FIG. 10 illustrates a state in which a closed state of the communication hole 15B has been released. As illustrated in FIG. 10, the gas generator 100B according to the second variation differs from the gas generator 100 illustrated in FIG. 2 in that a communication hole 15B is formed at a position separate from a through-hole 511B, and is otherwise generally the same. The gas generator 100B according to the second variation will be hereinafter described focusing on the difference with the gas generator 100.

As illustrated in FIG. 10, in the gas generator 100B, a plurality of the communication holes 15B are formed at positions separate from the through-holes 511B of the partition member 5. The plurality of communication holes 15B are formed at equal intervals in the outer circumferential direction of the inner cylinder member 4 and surround the inner cylinder member 4. Additionally, in the gas generator 100B, the through-holes 511B and the inner cylinder member 4 are fitted without gaps, and the combustion gas is prevented from passing through the gap between the inner wall of the through-hole 511B and the outer circumferential surface of the inner cylinder member 4.

Figure 11:
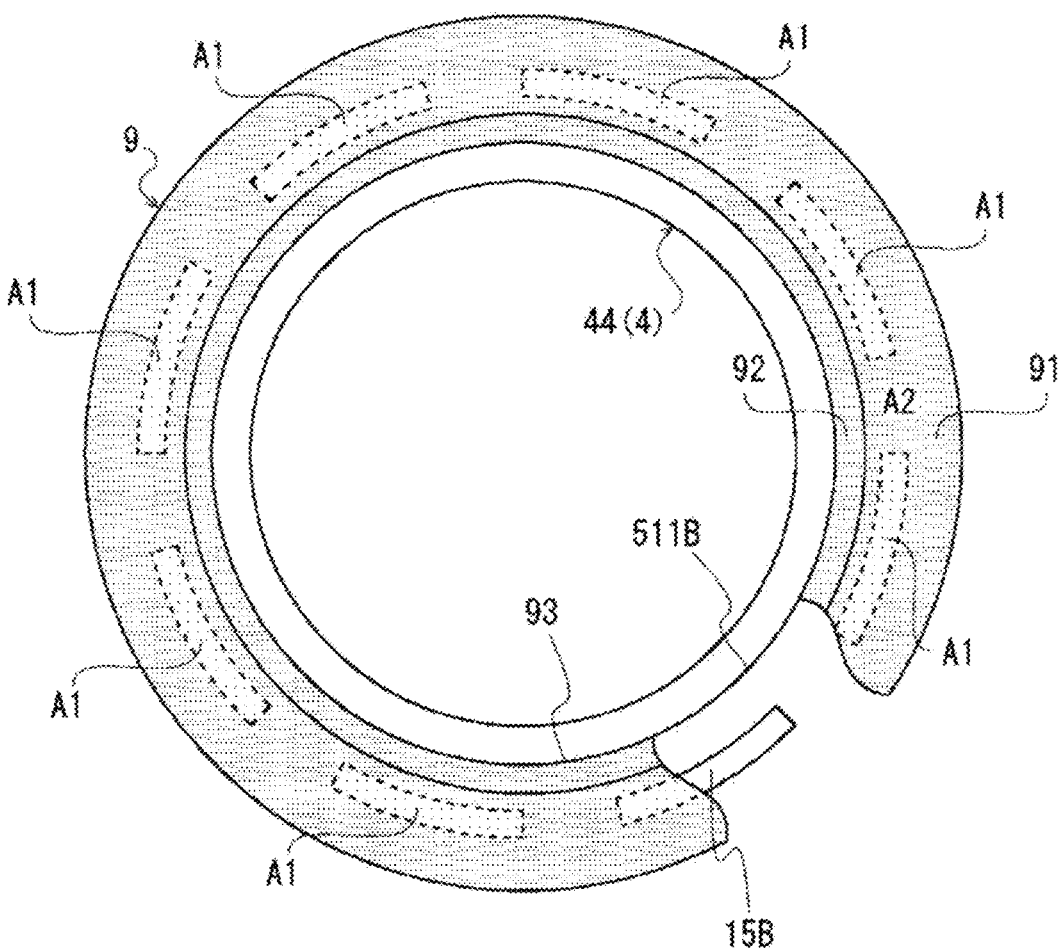
FIG. 11 is a top view of the internal structure of the gas generator according to the second variation of the first embodiment in a closed state.

FIG. 11 is a top view of the internal structure of the gas generator 100B in a closed state. As illustrated in FIG. 11, the plurality of communication holes 15B are in the closed state by having the closing member 9 cover the entire plurality of communication holes 15B from the first combustion chamber 11 side. At this time, because the through-hole 511B and the inner cylinder member 4 are fitted and the communication hole 15B is formed at a position separate from the through-hole 511B, the second region A2 is formed and surrounds the first region A1, as illustrated in FIG. 11. As a result, a large contact area for supporting the closing member 9 with respect to the combustion pressure of the first gas generating agent 110 is ensured, the closing member 9 can be more securely supported, and deformation of the partition member 5 due to the combustion pressure of the first gas generating agent 110 can be suppressed. In addition, in the present example, because the through-hole 511B and the inner cylinder member 4 are fitted without gaps, there is no need to close the gap by the closing member 9, and hence the fitting between the inner cylinder member 4 and the insertion hole 93 can be set relatively loosely, and the closing member 9 can be easily assembled. Note that, in a case where the fitting between the inner cylinder member 4 and the insertion hole 93 is a loose fit, the closing member 9 may be pressed from above by the first gas generating agent 110 and thus the closing member 9 does not separate from the communication hole 15 before the actuation of the gas generator 100B. Furthermore, as the plurality of communication holes 15B are formed at equal intervals in the outer circumferential direction of the inner cylinder member 4, the combustion pressure of the second gas generating agent 120 acts equally with respect to the closing member 9, and the closing member 9 is suppressed inclining and can be easily moved upward straightly. As a result, the plurality of communication holes 15B can be uniformly opened. However, the plurality of communication holes 15B may not be arranged at equal intervals. Additionally, the communication hole 15B may not be formed in plurals, and only one communication hole may be formed.

[Third Variation]

Figure 12:
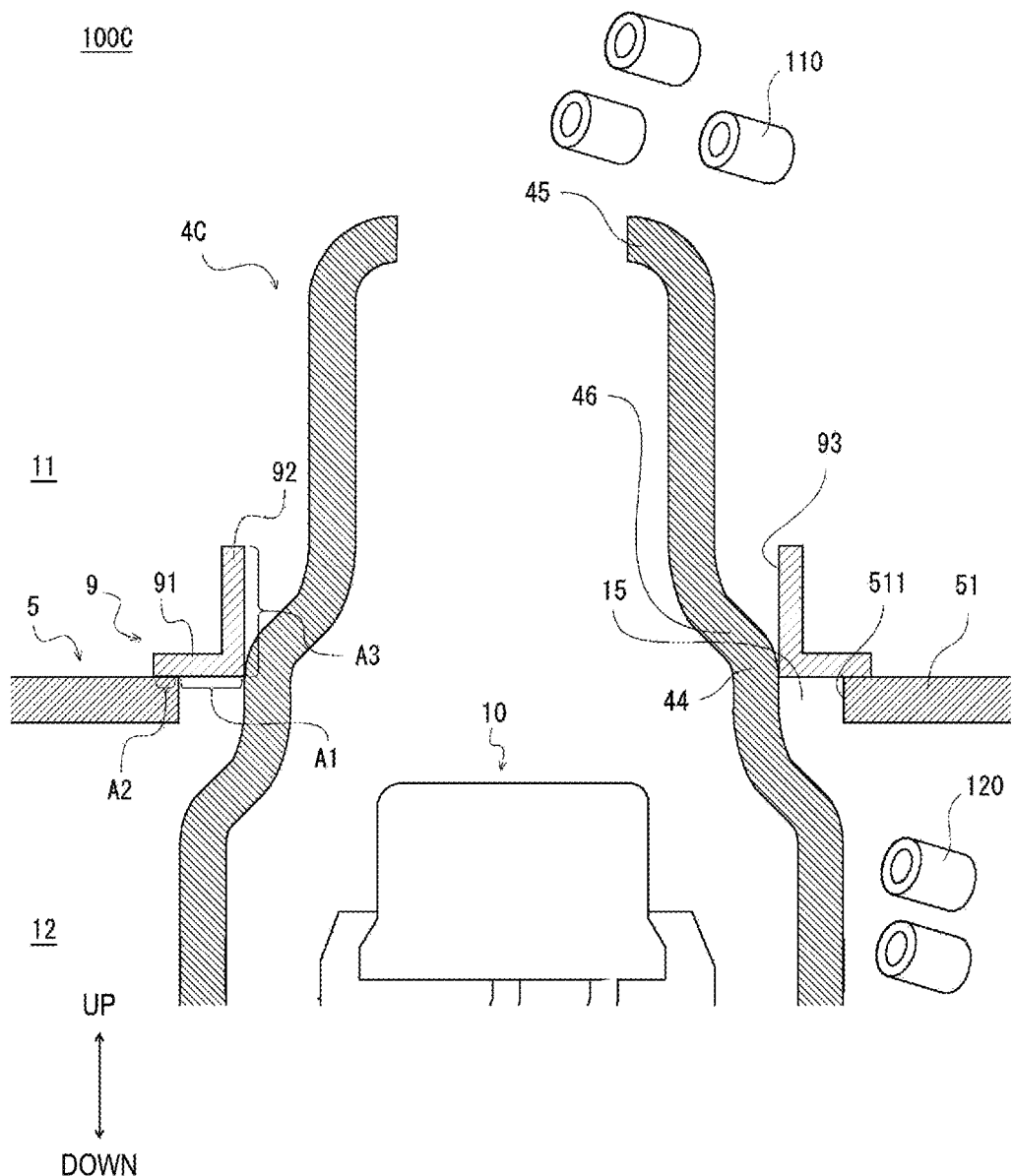
FIG. 12 is an axial cross-sectional view of an internal structure of a gas generator according to a third variation of the first embodiment in a closed state.

FIG. 12 is an axial cross-sectional view of an internal structure of a gas generator 100C according to a third variation of the first embodiment in a closed state. As illustrated in FIG. 12, an inner cylinder member 4C of the gas generator 100C according to the third variation differs from the inner cylinder member 4 of the gas generator 100 illustrated in FIG. 3 in that a small diameter portion 46 having a smaller outer diameter than the fitting portion 44 is formed. The gas generator 100C according to the third variation will be hereinafter described focusing on the difference with the gas generator 100.

As illustrated in FIG. 12, the inner cylinder member 4C of the gas generator 100C is configured to include, in addition to a fitting portion 44 that fits into the insertion hole 93 in the closed state, the small diameter portion 46 formed continuously with the fitting portion 44 on a side away from the second combustion chamber 12 than the fitting portion 44

(that is, on the distal end portion 45 side of the inner cylinder member 4C) in the axial direction. The outer diameter of the small diameter portion 46 is set to be smaller than the outer diameter of the fitting portion 44. Therefore, the fitting of the insertion hole 93 and the small diameter portion 46 is looser than the fitting of the insertion hole 93 and the fitting portion 44. Such a small diameter portion 46 is formed on the distal end side of the inner cylinder member 4C than the fitting portion 44, and thus, when the combustion pressure of the second gas generating agent 120 acts on the first region A1 of the closing member 9, the fitting between the insertion hole 93 and the fitting portion 44 is easily released, and thus the closing member 9 can rapidly move upward. Thus, when the second gas generating agent 120 is combusted, the closed state of the communication hole 15 can be rapidly released, and the combustion gas can rapidly flow from the second combustion chamber 12 into the first combustion chamber 11.

[Fourth Variation]

Figure 13:
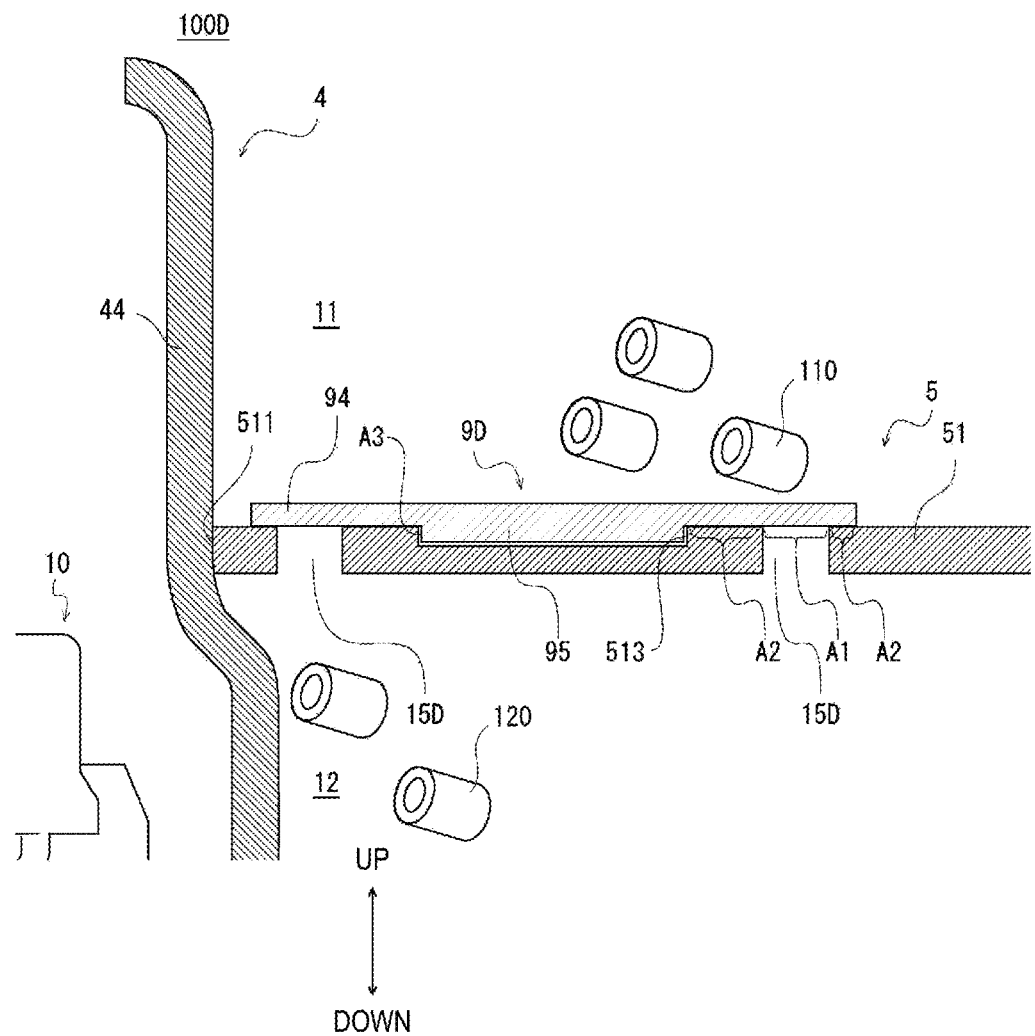
FIG. 13 is an axial cross-sectional view of an internal structure of a gas generator according to a fourth variation of the first embodiment in a closed state.

FIG. 13 is an axial cross-sectional view of an internal structure of a gas generator 100D according to a fourth variation of the first embodiment in a closed state. In the examples described above, a case has been described in which the inner cylinder member is formed as an engaged member and in which an engagement region that engages with the inner cylinder member in the closing member is formed as an inner wall of the insertion hole, but the gas generator according to the present disclosure is not limited thereto. As with the gas generator 100D illustrated in FIG. 13, the engagement region may be formed as the side wall of a convex part to be fitted with a fitting concave part formed on the partition member, with the partition member being the engaged member. The gas generator 100D according to the fourth variation will be hereinafter described focusing on the difference with the gas generator 100.

As illustrated in FIG. 13, in the gas generator 100D, a communication hole 15D is formed independently of the through-hole 511 through which the inner cylinder member 4 passes. Furthermore, a closing member 9D of the gas generator 100D includes a base 94 in which the first region A1 and the second region A2 are formed, and a fitting convex part 95 that projects out downward from the lower surface of the base 94. The engagement region A3 of the closing member 9D is formed as a side wall of the fitting convex part 95. A fitting concave part 513 that can be fitted with the fitting convex part 95 is formed in the dividing wall portion 51 of the partition member 5. In the gas generator 100D, in the closed state of the communication hole 15D, the fitting convex part 95 is fitted into the fitting concave part 513, and the engagement region A3 engages with the inner wall of the fitting concave part 513, thereby suppressing displacement of the closing member 9D and maintaining the closed state. When releasing the closed state of the communication hole 15D, the communication hole 15D can be more reliably opened by guiding the fitting convex part 95 with the fitting concave part 513, and thus the closing member 9D moves in a direction away from the communication hole 15D. Note that in this case, the closing member 9D may be pressed from above by the first gas generating agent 110 and thus the closing member 9D does not separate from the communication hole 15 before the actuation of the gas generator 100D.

Second Embodiment

In the first embodiment, a gas generator configured such that the entire closing member moves (displaces) in a direction from the second combustion chamber side toward the first combustion chamber side by the combustion pressure of the second gas generating agent has been described, but the gas generator according to the present disclosure is not limited thereto. The gas generator merely needs to be configured such that at least a part of the closing member, the closing member including a displacement portion that is formed continuously so as to be included at least a part of the first region, displaces in a direction from the side of the second combustion chamber toward the side of the first combustion chamber by the combustion pressure of the second gas generating agent. Hereinafter, as the second embodiment, a gas generator configured such that the displacement portion, rather than the entire closing member, is displaced by the combustion pressure of the second gas generating agent will be described. Note that the gas generator according to the second embodiment will be described focusing on the difference with the gas generator 100 according to the first embodiment, and the same reference signs will be denoted on parts similar to the gas generator 100 and a more detailed description will be omitted.

Figure 14:
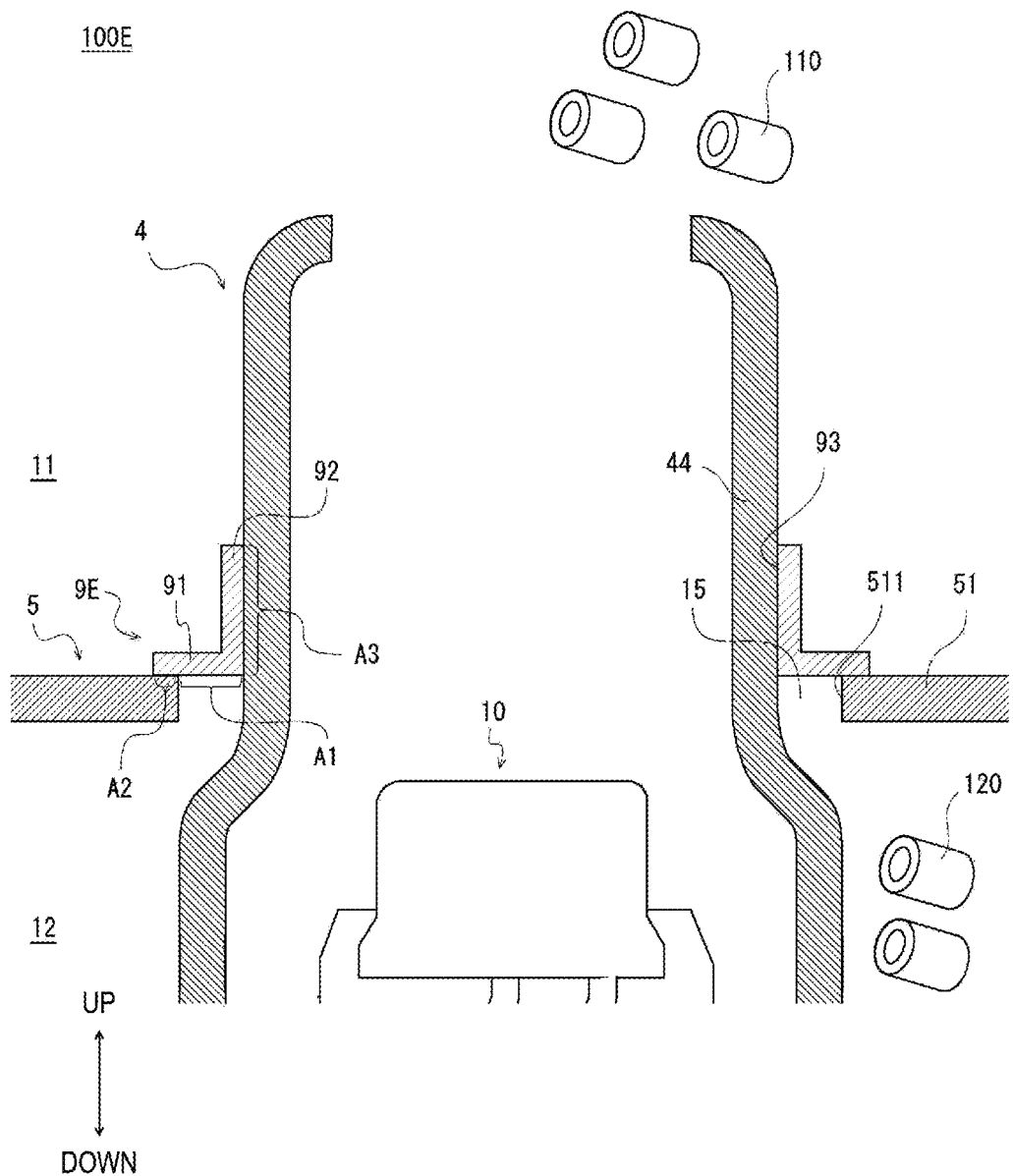
FIG. 14 is an axial cross-sectional view of an internal structure of a gas generator according to a second embodiment in a closed state.
Figure 15:
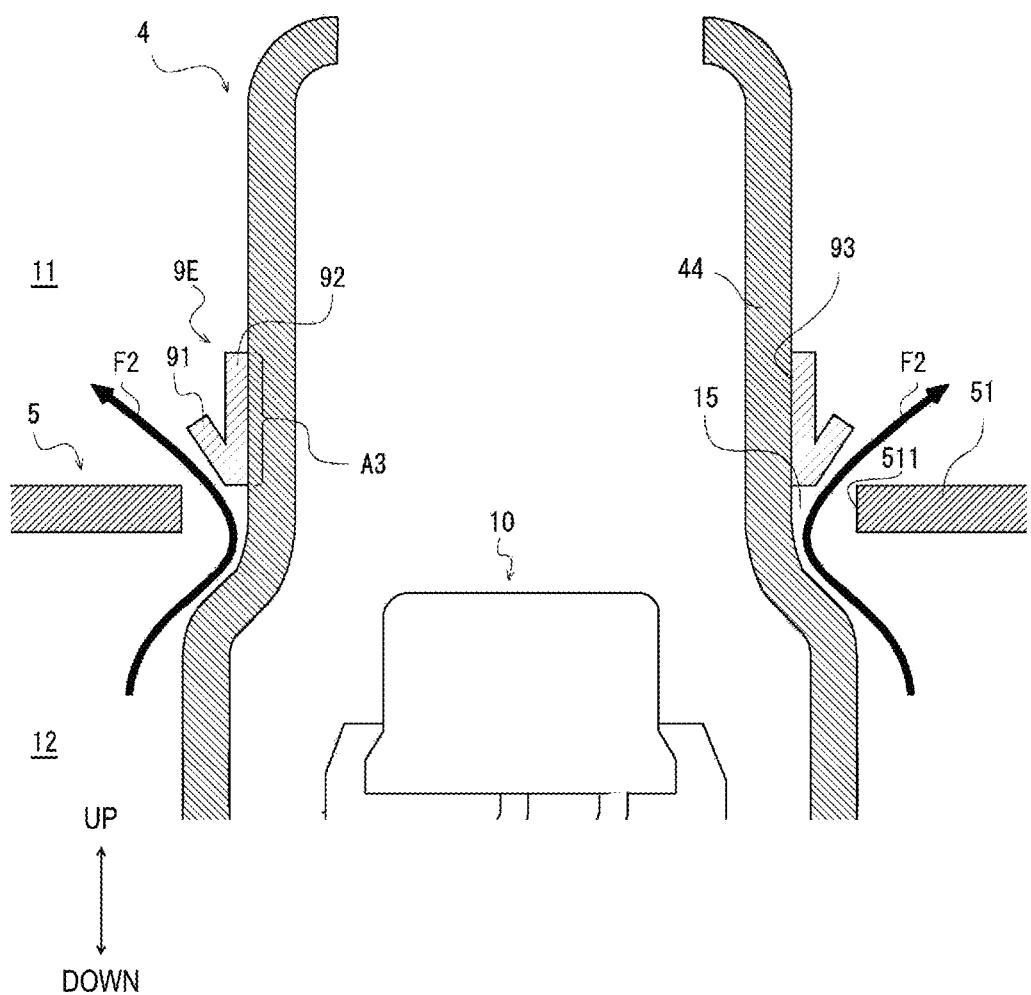
FIG. 15 is a diagram illustrating a state when a second igniter is actuated in the gas generator according to the second embodiment.

FIG. 14 is an axial cross-sectional view of an internal structure of a gas generator according to a second embodiment in a closed state. FIG. 15 is a diagram illustrating a state when a second igniter is actuated in the gas generator according to the second embodiment. As illustrated in FIG. 14, a closing member 9E is formed by integrating the annular portion 91 having an annular shape and the cylindrical portion 92 having a cylindrical shape, which is provided coaxially with the annular portion 91 and has a smaller outer diameter than the annular portion 91, and the closing member 9E includes the insertion hole 93 into which the inner cylinder member 4 is inserted. The annular portion 91 includes a part of the first region A1 and is formed continuously. In the present example, the annular portion 91 corresponds to the "displacement portion" according to the present disclosure.

In a gas generator 100E as well, similar to the closing member 9 of the first embodiment, the closing member 9E is supported at the partition member 5 in the second region A2 by the combustion pressure of the first gas generating agent 110, thereby maintaining the communication hole 15 in the closed state. As a result, the inflammation from the first combustion chamber 11 to the second combustion chamber 12 is prevented. As illustrated in FIG. 15, the closing member 9E according to the second embodiment is configured such that the annular portion 91 is bent toward the upper side by deforming from the combustion pressure of the second gas generating agent 120 acting on the first region A1. Here, because the annular portion 91 is a site including a part of the first region A1 exposed to the second combustion chamber 12 in the closed state, the portion of the first region A1 also separates from the communication hole 15 when the annular portion 91 is bent upward and separates from the communication hole 15, thereby releasing the closed state.

As described above, according to the gas generator 100E, the annular portion 91 is configured to separate from the communication hole 15 by the combustion pressure of the second gas generating agent 120 acting on the first region A1. Because the annular portion 91 is formed as a site that continues while including a part of the first region A1, the communication hole 15 can be opened in the same manner regardless of the presence or absence and the degree of the pressure unevenness and the load unevenness of the combustion pressure acting on the first region A1, and the opening area of the communication holes 15 can be obtained with good reproducibility.

Variation of Second Embodiment

Figure 16:
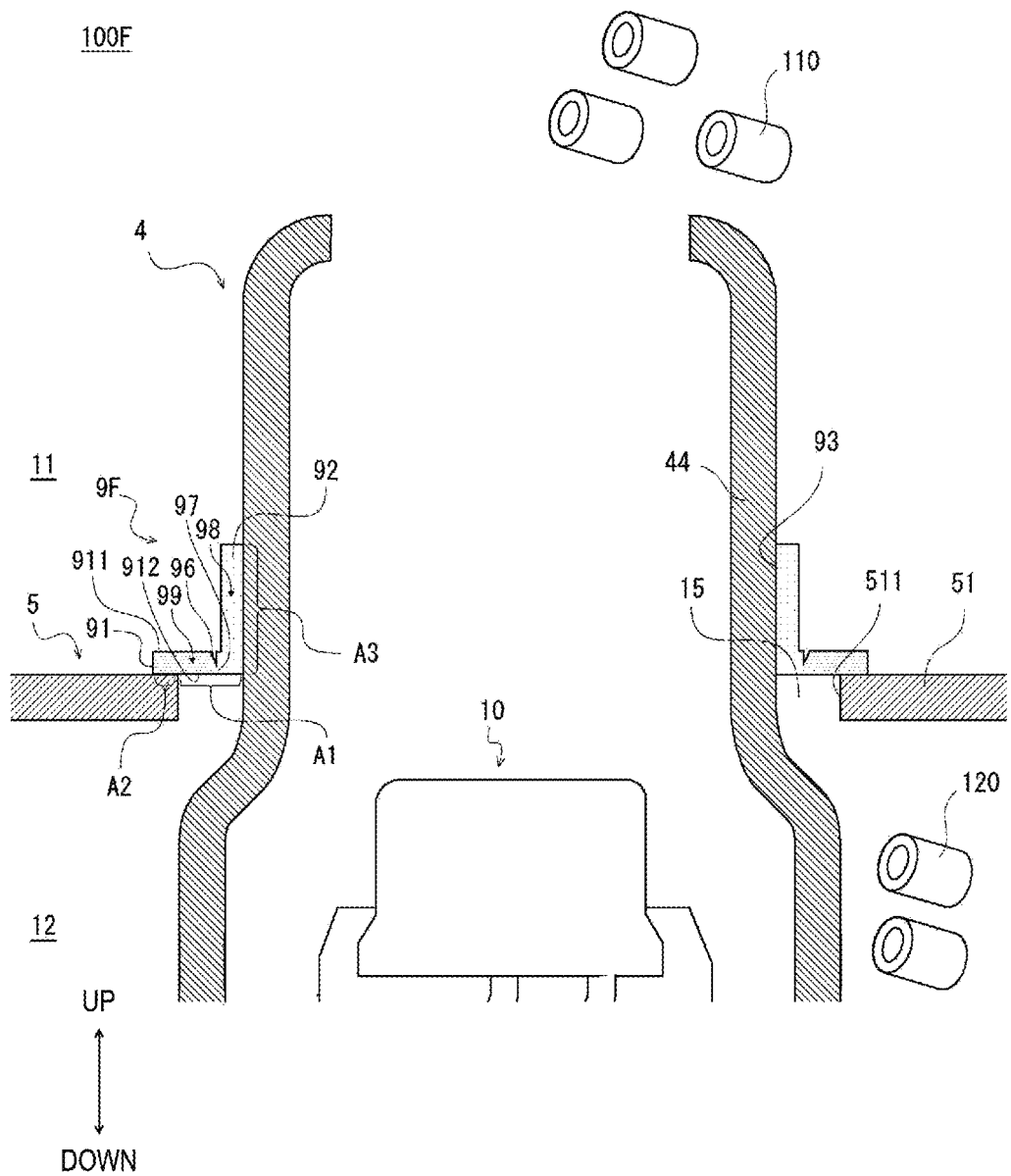
FIG. 16 is an axial cross-sectional view of an internal structure of a gas generator according to a variation of the second embodiment in a closed state.
Figure 17:
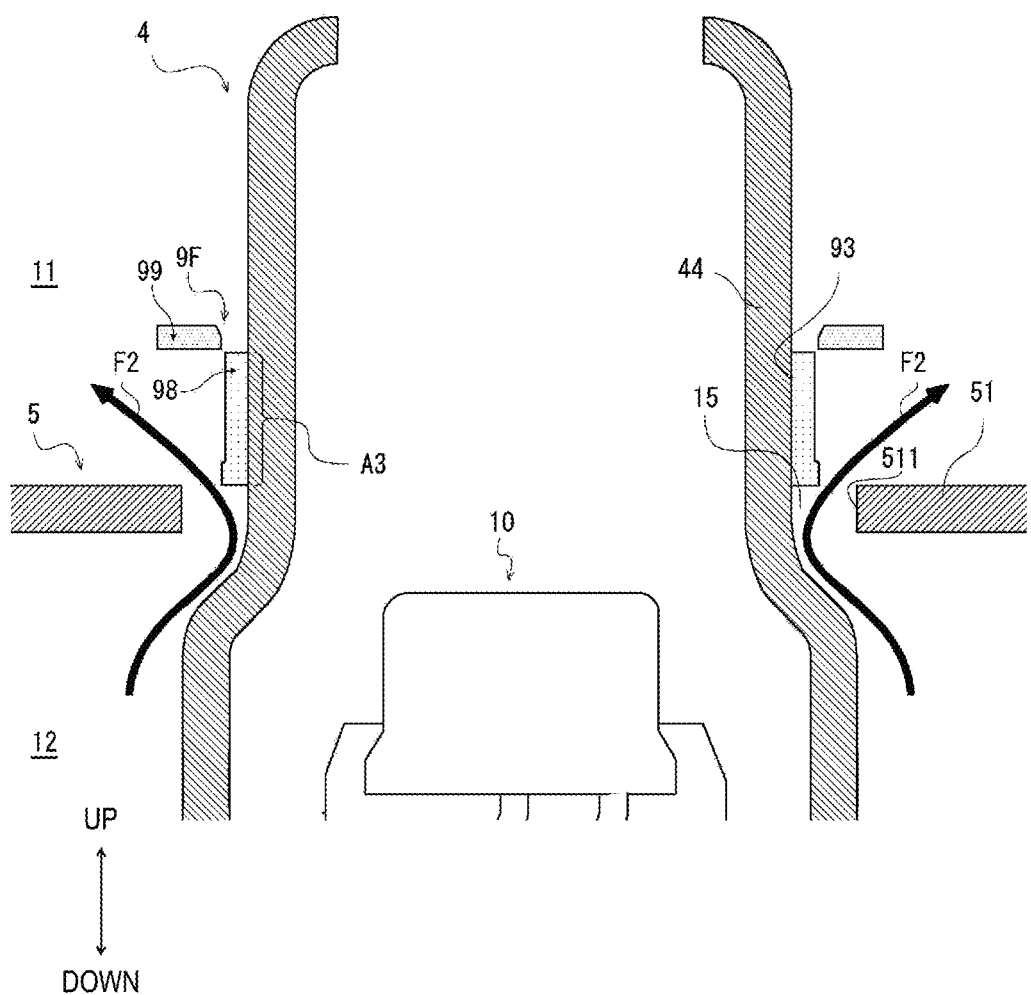
FIG. 17 is a diagram illustrating a state when a second igniter is actuated in the gas generator according to the variation of the second embodiment.

FIG. 16 is an axial cross-sectional view of the internal structure of the gas generator according to a variation of the second embodiment in a closed state. FIG. 17 is a diagram illustrating a state when a second igniter is actuated in the gas generator according to the variation of the second embodiment. As illustrated in FIG. 16, a closing member 9F of a gas generator 100F according to the variation of the second embodiment differs from the closing member 9 illustrated in FIG. 2 in that a groove portion indicated by the reference sign 96 is formed in the first region A1, but is otherwise generally the same.

As illustrated in FIG. 16, the groove portion 96 is formed at a midway position in the radial direction of an upper surface 911 of the annular portion 91, and extends along the circumferential direction. By forming the groove portion 96 in the first region A1, a thinned part 97 having a thinner thickness in the vertical direction than other sites of the first region A1 is formed between the groove portion 96 in the first region A1 and a lower surface 912 of the annular portion 91. The thinned part 97 partitions the closing member 9F into an inner portion 98, which is a site on the inner side than the thinned part 97, and an outer portion 99, which is a site on the outer side than the thinned part 97, in the radial direction thereof. In FIG. 16, the distinction between the inner portion 98 and the outer portion 99 is represented by the difference in dot patterns. The inner portion 98 is formed in a cylindrical shape including the engagement region A3. The outer portion 99 is formed in an annular shape while including the second region A2. Since the thinned part 97 is formed in the first region A1, the outer portion 99 is a site that continues while including a part of the first region A1. In the present example, the outer portion 99 corresponds to a "displacement portion" according to the present disclosure. Here, because the thinned part 97 is formed to be thinner than other sites of the first region A1, the strength thereof is made weaker than that of the outer portion 99. In this example, the thinned part 97 corresponds to a "fragile part" according to the present disclosure.

In the gas generator 100F as well, similar to the closing member 9 of the first embodiment, the closing member 9F is supported at the partition member 5 in the second region A2 by the combustion pressure of the first gas generating agent 110, thereby maintaining the communication hole 15 in the closed state. As a result, the inflammation from the first combustion chamber 11 to the second combustion chamber 12 is prevented.

When the second gas generating agent 120 is combusted, the combustion pressure acts on the first region A1. At this time, the combustion pressure also acts on the thinned part 97 since the thinned part 97 is formed in the first region A1. Here, a load is applied to the outer portion 99 by the combustion pressure of the second gas generating agent 120, and the stress acts on the thinned part 97, and the strength of the thinned part 97 and the fitting between the insertion hole 93 and the inner cylinder member 4 are set such that the outer portion 99 separates from the thinned part 97 leaving the inner portion 98 including the engagement region A3. Thus, as illustrated in FIG. 17, the outer portion 99 moves upward while being guided by the inner cylinder member 4 by the combustion pressure of the second gas generating agent 120, and separates from the communication hole 15.

As a result, the site of the first region A1 included in the outer portion 99 also separates from the communication hole 15, and the closed state of the communication hole 15 is released.

As described above, according to the gas generator 100F according to the variation of the second embodiment, the outer portion 99 is configured to separate from the communication hole 15 by the combustion pressure of the second gas generating agent 120 acting on the first region A1, and as the outer portion 99 is formed as a site that continues while including a part of the first region A1, the communication hole 15 can be opened in the same manner regardless of the presence or absence and the degree of the pressure unevenness and the load unevenness of the combustion pressure acting on the first region A1, whereby the opening area of the communication hole 15 can be obtained with good reproducibility.

Furthermore, in the gas generator 100F, the thinned part 97 is formed in the first region A1, and the thinned part 97 has a strength weaker than that of the outer portion 99 such that the closing member 9F deforms due to the combustion pressure of the second gas generating agent 120 acting on the first region A1, and that the outer portion 99 preferentially displaces with respect to the engagement region A3 engaged with the inner cylinder member 4. As a result, the outer portion 99 easily moves upward when the combustion pressure of the second gas generating agent 120 acts on the first region A1. As a result, when the second gas generating agent 120 is combusted, the closed state of the communication hole 15 can be rapidly released, and hence the combustion gas can rapidly flow from the second combustion chamber 12 into the first combustion chamber 11. In addition, when the communication hole 15 is in the closed state, the closed state can be more reliably maintained by suppressing the shift of the closing member 9F by the fitting of the inner cylinder member 4 and the insertion hole 93, and when the closed state of the communication hole 15 is released, the outer portion 99 is guided by the inner cylinder member 4 and moves in a direction away from the communication hole 15, and the communication hole 15 can be more reliably opened.

Note that in the present example, the case in which the closing member 9F deforms and be broken at the thinned part 97 has been described, but the deformation of the closing member 9F may not involve breakage. The closing member 9F may be deformed, for example, such that the outer portion 99 bends to the upper side with the thinned part 97 as the starting point. In this case, a fragile part extending in a radial direction may be formed in the outer portion 99 and facilitate deformation of the outer portion 99. Furthermore, in the present example, the fragile part has been formed as the thinned part 97, but the fragile part of the present disclosure is not limited thereto. For example, in the closing member, the displacement portion and the other sites may be formed of different materials, and the fragile part may be formed as a joining surface between the displacement portion and the other sites. Additionally, in the second embodiment described above, the displacement portion merely needs to include at least a part of the first region, but the displacement portion may include the entire first region. In this way, the entire first region may be separated from the communication hole, and the entire communication hole can be uniformly opened.

Other Examples

Furthermore, suitable embodiments of the present disclosure have been described, but each aspect disclosed in the present specification can be combined with any other features disclosed in the present specification.

REFERENCE SIGNS LIST

1 Housing
11 First combustion chamber
12 Second combustion chamber
13 Gas discharge port
15 Communication hole
4 Inner cylinder member (one example of engaged member)
44 Fitting portion
46 Small diameter portion
5 Partition member (one example of engaged member)
511 Through-hole
512 Projecting piece
513 Fitting concave part
9 Closing member
91 Annular portion (one example of displacement portion)
92 Cylindrical portion
93 Insertion hole
94 Base
95 Fitting convex part
96 Groove portion
97 Thinned part (one example of fragile part)
98 Inner portion
99 Outer portion (one example of displacement portion)
10 First igniter
20 Second igniter
110 First gas generating agent
120 Second gas generating agent
100 Gas generator
A1 First region
A2 Second region
A3 Engagement region

The invention claimed is:

1. A gas generator comprising:
a housing;
a first igniter;
a second igniter to be actuated independently of the first igniter;
a partition structure to define, in the housing, a first combustion chamber in which the first igniter and a first gas generating agent combusted by actuation of the first igniter are accommodated and a second combustion chamber in which the second igniter and a second gas generating agent combusted by actuation of the second igniter are accommodated; and
a gas discharge port, provided in the housing, to connect the first combustion chamber and outside of the housing,
wherein at least one communication hole provided in the partition structure connects the first combustion chamber and the second combustion chamber, and
a single closing structure is further provided to entirely cover the at least one communication hole from a side of the first combustion chamber to obtain a closed state in which the at least one communication hole is closed;
the closing structure includes,
a first surface exposed to a side of the second combustion chamber in the closed state,
a second surface in contact with the partition structure from the side of the first combustion chamber in the closed state, and
an engagement surface that is engaged with an engaged structure fixed in the housing in the closed state; and
wherein the closing structure is configured to:
have the at least one communication hole to be in the closed state by the closing structure being supported by the partition structure at the second surface due to combustion pressure of the first gas generating agent; and have the closed state released by at least a part of the closing structure,
the closing structure including a displacement portion that is formed continuously so as to include at least a part of the first surface, the closing structure being displaced in a direction from the side of the second combustion chamber toward the side of the first combustion chamber by combustion pressure of the second gas generating agent acting on the first surface.

2. The gas generator according to claim 1, wherein a fragile part is formed in the first surface such that the closing structure deforms and the displacement portion displaces with respect to the engagement surface when the combustion pressure of the second gas generating agent acts on the first surface.

3. The gas generator according to claim 2, wherein
an inner cylinder structure having a cylindrical shape is provided, the inner cylinder structure in which the first igniter is accommodated and in which a space inside the inner cylinder structure forms a part of the first combustion chamber being provided as the engaged structure;
a through-hole into which the inner cylinder structure is inserted is formed in the partition structure; and
the engagement surface is formed as an inner wall of an insertion hole that fits with the inner cylinder structure such that the inner cylinder structure is inserted and that the displacement portion moves along an axial direction of the inner cylinder structure due to the combustion pressure of the second gas generating agent acting on the first surface.

4. The gas generator according to claim 3, wherein
a gap is formed between an outer circumferential surface of the inner cylinder structure and an inner wall of the through-hole, and
the at least one communication hole is formed as the gap.

5. The gas generator according to claim 4, wherein a projecting structure that projects toward an inner side in a radial direction and comes into contact with the second surface in the closed state is formed on the inner wall of the through-hole.

6. The gas generator according to claim 3, wherein
the through-hole and the inner cylinder structure are fitted; and
the at least one communication hole is formed at a position different from the through-hole in the partition structure.

7. The gas generator according to claim 1, wherein
an inner cylinder structure having a cylindrical shape is provided, the inner cylinder in which the first igniter is accommodated and in which a space inside the inner cylinder structure forms a part of the first combustion chamber being provided as the engaged structure;
a through-hole into which the inner cylinder structure is inserted is formed in the partition structure; and
the engagement surface is formed as an inner wall of an insertion hole that fits with the inner cylinder structure such that the inner cylinder structure is inserted and that the closing structure moves along an axial direction of the inner cylinder structure due to the combustion pressure of the second gas generating agent acting on the first surface.

8. The gas generator according to claim 7, wherein the inner cylinder structure includes a fitting portion that fits into the insertion hole in the closed state, and a small diameter portion that is formed continuously with the fitting portion in an axial direction of the inner cylinder structure on a side away from the second combustion chamber than the fitting portion, the small diameter portion having a smaller outer diameter than the fitting portion.

9. The gas generator according to claim 8, wherein
a gap is formed between an outer circumferential surface of the inner cylinder structure and an inner wall of the through-hole, and
the at least one communication hole is formed as the gap.

10. The gas generator according to claim 9, wherein a projecting structure that projects toward an inner side in a radial direction and comes into contact with the second surface in the closed state is formed on the inner wall of the through-hole.

11. The gas generator according to claim 8, wherein
the through-hole and the inner cylinder structure are fitted; and
the at least one communication hole is formed at a position different from the through-hole in the partition structure.

12. The gas generator according to claim 7, wherein
a gap is formed between an outer circumferential surface of the inner cylinder structure and an inner wall of the through-bole, and
the at least one communication hole is formed as the gap.

13. The gas generator according to claim 12, wherein a projecting structure that projects toward an inner side in a radial direction and comes into contact with the second surface in the closed state is formed on the inner wall of the through-hole.

14. The gas generator according to claim 7, wherein
the through-hole and the inner cylinder structure are fitted; and
the at least one communication hole is formed at a position different from the through-hole in the partition structure.

15. A gas generator, comprising:
a housing provided with a gas discharge port;
a first combustion chamber provided within the housing and including therein a first igniter and a first gas generating agent;
a second combustion chamber provided within the housing and including therein a second igniter and a second gas generating agent;
a partition structure provided within the housing and defining the first combustion chamber and the second combustion chamber;
a communication hole provided in the partition structure and connecting the first combustion chamber and the second combustion chamber; and
a closure covering and closing the communication hole before actuation of the gas generator, and provided within the first combustion chamber so as to slide with respect to an engaged structure that is provided within the housing during the actuation of the gas generator, the closure opening the communication hole when the closure slides, the closure including,
a first surface opposing the communication hole and being exposed to the second combustion chamber before the actuation of the gas generator,
a second surface formed integrally with the first surface and being on the partition structure from a side of the first combustion chamber before the actuation of the gas generator, and
an engagement surface formed integrally with the first surface and the second surface, and being slidably engaged with the engaged structure,
wherein the closure slides when the first surface receives a combustion gas generated in the second combustion chamber to open the communication hole due to the second surface moving away from the partition structure.

16. The gas generator according to claim 15, wherein the communication hole includes a plurality of projection structures projecting toward an inner side and arranged in a radial direction of the communication hole, and each of distal ends of the plurality of projection structures extends to an outer circumferential surface of the engaged structure.

17. A gas generator, comprising:
a housing provided with a gas discharge port;
a first combustion chamber provided within the housing and including therein a first igniter and a first gas generating agent;
a second combustion chamber provided within the housing and including therein a second igniter and a second gas generating agent;
a partition structure provided within the housing and defining the first combustion chamber and the second combustion chamber;
a communication hole provided in the partition structure and connecting the first combustion chamber and the second combustion chamber; and
a closure provided within the first combustion chamber and engaged with an engaged structure that is provided within the housing, the closure covering and closing the communication hole before actuation of the gas generator and the closure including:
a first surface opposing the communication hole and being exposed to the second combustion chamber before the actuation of the gas generator,
a second surface formed integrally with the first surface and being on the partition structure from a side of the first combustion chamber before the actuation of the gas generator,
an engagement surface formed integrally with the first surface and the second surface, and being fixed to the engaged structure, and
at least one of a deformable portion or a weakened portion formed between the first surface and the engagement surface at which the first surface and the second surface are bent with respect to the engagement surface or the first surface and the second surface are further apart from the engagement surface, upon receipt of a combustion gas generated in the second combustion chamber to open the communication hole.

18. The gas generator according to claim 17, wherein the first surface is provided between the engagement surface and the second surface, and the at least one of the deformable portion or the weakened portion is a groove formed between the first surface and the engagement surface.

19. The gas generator according to claim 17, wherein the communication hole includes a plurality of projection structures projecting toward an inner side and arranged in a radial direction of the communication hole, and each of distal ends of the plurality of projection structures extends to an outer circumferential surface of the engaged structure.

\* \* \* \* \*